US007172668B2

(12) United States Patent
Key

(10) Patent No.: US 7,172,668 B2

(45) Date of Patent: *Feb. 6, 2007

(54) ROTATABLE LABEL SYSTEM AND METHOD

(75) Inventor: Stephen M. Key, Modesto, CA (US)

(73) Assignee: Stephen Key Design, LLC, Modesto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/764,403

(22) Filed: Jan. 23, 2004

(65) Prior Publication Data

US 2004/0166277 A1 Aug. 26, 2004

Related U.S. Application Data

(60) Continuation of application No. 10/112,542, filed on Mar. 27, 2002, now abandoned, and a continuation of application No. 10/005,428, filed on Dec. 3, 2001, now Pat. No. 7,087,298, and a continuation-in-part of application No. 09/551,985, filed on Apr. 15, 2000, now Pat. No. 6,402,872, which is a continuation-in-part of application No. 09/126,010, filed on Jul. 29, 1998, now Pat. No. 6,086,697, application No. 10/112,542, which is a continuation-in-part of application No. 09/866,219, filed on May 25, 2001, now Pat. No. 6,631,578, and a division of application No. 09/551,985, filed on Apr. 15, 2000, now Pat. No. 6,402,872, application No. 09/866,219, which is a continuation of application No. 09/273,232, filed on Mar. 18, 1999, now Pat. No. 6,237,269.

(60) Provisional application No. 60/279,236, filed on Mar. 27, 2001.

(51) Int. Cl.

| | |
|---|---|
| *B32B 37/10* | (2006.01) |
| *B32B 37/30* | (2006.01) |
| *B32B 38/10* | (2006.01) |
| *G09F 11/02* | (2006.01) |
| *G09F 11/23* | (2006.01) |

(52) U.S. Cl. ........................ 156/86; 156/247; 156/344; 40/306; 40/310; 40/488; 40/506; 206/772; 206/774; 428/34.9; 428/46

(58) Field of Classification Search .................. 40/306, 40/310, 487, 488, 506; 156/86, 344, 247; 206/769, 772, 774; 215/253; 428/34.9, 428/45, 46

See application file for complete search history.

(56) References Cited

U.S. PATENT DOCUMENTS

| | | | |
|---|---|---|---|
| 736,035 | A | 8/1903 | Stevenson |
| 1,054,826 | A | 3/1913 | Cole |
| 1,064,576 | A | 6/1913 | Washburn |
| 1,145,367 | A | 7/1915 | Herter |
| 1,312,611 | A | 8/1919 | Chess |
| 1,334,031 | A | 3/1920 | Hahn |
| 1,387,625 | A | 8/1921 | Stein |
| 1,486,313 | A | 3/1924 | Van Antwerp |
| 2,013,616 | A | 9/1935 | Rettenmeyer |
| 2,069,609 | A | 2/1937 | Hanson |
| 2,129,364 | A | 9/1938 | Simons et al. |
| 2,441,607 | A | 5/1948 | Walls |
| 2,468,000 | A | 4/1949 | Taylor |
| 2,504,076 | A | 4/1950 | Lindblom |
| 2,706,464 | A | 4/1955 | North |
| 2,738,564 | A | 3/1956 | Guinane |
| 2,739,564 | A | 3/1956 | North |
| 2,844,893 | A | 7/1958 | Keller |
| 2,860,431 | A | 11/1958 | Barnum, Jr. |
| 2,931,657 | A | 4/1960 | Lewis |
| 2,935,814 | A | 5/1960 | Freeze |
| 2,971,283 | A | 2/1961 | Parker |
| 3,278,182 | A | 10/1966 | Lescher |
| 3,374,911 | A | 3/1968 | White |
| 3,468,467 | A | 9/1969 | Amberg |
| 3,488,880 | A | 1/1970 | Taylor |
| 3,542,229 | A | 11/1970 | Beyerlein et al. |
| 3,604,584 | A | 9/1971 | Shank, Jr. |
| 3,733,002 | A | 5/1973 | Fujio |
| 3,750,317 | A | 8/1973 | Morgan |
| 3,874,977 | A | 4/1975 | Pyles |

| | | | | |
|---|---|---|---|---|
| 3,960,713 | A | 6/1976 | Carey | |
| 4,044,889 | A | 8/1977 | Orentreich et al. | |
| 4,057,251 | A | 11/1977 | Jones et al. | |
| 4,203,240 | A | 5/1980 | Goodwin | |
| 4,312,523 | A | 1/1982 | Haines | |
| 4,381,615 | A | 5/1983 | Lonsmin | |
| 4,405,045 | A | 9/1983 | Villa-Real | |
| 4,505,497 | A | 3/1985 | Katzman | |
| 4,567,681 | A | 2/1986 | Fumei | |
| 4,658,974 | A | 4/1987 | Fujita et al. | |
| 4,724,973 | A | 2/1988 | Shah | |
| 4,727,667 | A | 3/1988 | Ingle | |
| 4,732,411 | A | 3/1988 | Siegel | |
| 4,844,760 | A | 7/1989 | Dickey | |
| 4,877,119 | A | 10/1989 | Hosking | |
| 4,918,604 | A | 4/1990 | Baum | |
| 5,076,613 | A | 12/1991 | Kovacs | |
| 5,116,452 | A | 5/1992 | Eder | |
| 5,154,448 | A | 10/1992 | Griffin et al. | |
| 5,207,011 | A * | 5/1993 | Coulthard | 40/594 |
| 5,209,367 | A | 5/1993 | Van Musscher et al. | |
| 5,321,933 | A | 6/1994 | Seifert et al. | |
| 5,324,559 | A | 6/1994 | Brombacher | |
| 5,342,093 | A | 8/1994 | Weernink | |
| 5,363,576 | A | 11/1994 | Piana et al. | |
| 5,403,636 | A | 4/1995 | Crum | |
| 5,484,167 | A | 1/1996 | Donaldson et al. | |
| 5,525,383 | A | 6/1996 | Witkowski | |
| 5,605,230 | A | 2/1997 | Marino, Jr. et al. | |
| 5,639,529 | A | 6/1997 | Gozdecki et al. | |
| 5,712,021 | A | 1/1998 | Hernandez | |
| 5,727,766 | A | 3/1998 | Mayo | |
| 5,800,893 | A | 9/1998 | Harden | |
| 5,809,674 | A | 9/1998 | Key | |
| 5,842,633 | A | 12/1998 | Nurse | |
| 5,883,370 | A | 3/1999 | Walker et al. | |
| 5,884,421 | A | 3/1999 | Key | |
| 5,953,170 | A | 9/1999 | Glancy | |
| 6,047,488 | A | 4/2000 | Tuszkiewicz | |
| 6,086,697 | A | 7/2000 | Key | |
| 6,129,802 | A | 10/2000 | Key | |
| 6,129,959 | A | 10/2000 | Mercer et al. | |
| 6,158,612 | A | 12/2000 | Alpert | |
| 6,212,803 | B1 | 4/2001 | Key | |
| 6,237,269 | B1 | 5/2001 | Key | |
| 6,253,438 | B1 | 7/2001 | Jespersen | |
| 6,254,138 | B1 * | 7/2001 | Rawlings et al. | 283/81 |
| 6,258,200 | B1 | 7/2001 | Kassab | |
| 6,360,462 | B1 | 3/2002 | Mengel | |
| 6,385,878 | B1 | 5/2002 | Key | |
| 6,402,872 | B1 | 6/2002 | Key | |
| 6,454,094 | B1 | 9/2002 | Salani | |
| 6,631,578 | B2 | 10/2003 | Key | |
| 6,649,007 | B1 | 11/2003 | Key | |
| 2004/0247863 | A1 * | 12/2004 | Scott | 428/343 |

FOREIGN PATENT DOCUMENTS

| | | | |
|---|---|---|---|
| DK | 85214 | | 3/1958 |
| EP | 0285514 | A1 | 10/1988 |
| FR | 965522 | | 9/1950 |
| FR | 1114750 | | 4/1956 |
| FR | 1347102 | | 11/1963 |
| FR | 2460260 | | 1/1981 |
| FR | 2677786 | | 12/1992 |
| IT | 327286 | | 7/1935 |
| SE | 1565 | | 6/1888 |
| WO | WO 98/19289 | A1 | 5/1998 |
| WO | WO 00/48161 | | 8/2000 |

OTHER PUBLICATIONS

U.S. Appl. No. 10/005,428, filed Dec. 3, 2001, Stephen M. Key, Rotating Label System.

* cited by examiner

*Primary Examiner*—Mark A. Osele
(74) *Attorney, Agent, or Firm*—Carr & Ferrell LLP

(57) ABSTRACT

A system and method are disclosed for constructing a rotatable label and attaching the rotatable label to a container. The rotatable label system comprises an inner label attached to the container and a rotatable outer label. The inner label may have adhesive on a rear surface of a trailing end alone, adhesive on a rear surface of both the leading and trailing end for fixedly attaching it to a container, or adhesive on the entire rear surface. The outer label may only have adhesive on a rear surface at or near a trailing end to secure the outer label to itself. The outer label is temporarily coupled to, the container while the outer label is wrapped around the container. Once the trailing end is attached to a front surface of the outer label at or near a leading end of the outer label, the outer label can be rotated about the container over the inner label. Longitudinal movement of the outer label relative to the container may be restricted by disposing the outer label between top and bottom label panels formed on the container. The outer label is preferably adapted with a transparent portion or window permitting viewing of indicia disposed on the inner label.

31 Claims, 20 Drawing Sheets

ROTATABLE LABEL SYSTEM AND METHOD

CROSS-REFERENCES TO RELATED PATENTS AND APPLICATIONS

The present application is a continuation of and claims the priority benefit U.S. patent application Ser. No. 10/112,542 filed Mar. 27, 2002 and entitled "System and Method for a Rotating Sleeve Device" and now abandoned and is also a continuation of and claims the priority benefit of U.S. patent application Ser. No. 10/005,428 filed Dec. 3, 2001 now U.S. Pat No. 7,087,298 and entitled "Rotating Label System."

U.S. patent application Ser. No. 10/112,542 is a continuation-in part of U.S. patent application Ser. No. 09/866,219 filed May 25, 2001 and now U.S. Pat. No. 6,631,578 issued Oct. 14, 2003 and entitled "Roll Fed Method for Constructing a Rotatable Label System" and a continuation-In-part of U.S. patent application Ser. No. 09/551,385 filed Apr. 15, 2000 U.S. Pat. No. 6,402,872 issued Jun. 11, 2002 and entitled "Rotating Label System and Method" and also claims the priority benefit of U.S. Provisional Patent Application No. 60/279,236 filed Mar. 27, 2001.

U.S. Pat. No 6,631,578 is a continuation of U.S. patent application Ser. No. 09/273,232 filed Mar. 18, 1999 and now U.S. Pat. No. 6,237,269 issued on May 29, 2001 and entitled "Roll-Fed Method for Constructing a Rotatable Label System." U.S. Pat. No. 6,402,872 is a continuation-in-part of U.S. patent application Ser. No. 09/126,010 filed Jul. 29, 1998 and now U.S. Pat. No. 6,086,697 issued Jul. 11, 2000 and entitled "Rotating Label System and Method."

U.S. patent application Ser. No. 10/005,428 in a divisional application of U.S. patent application Ser. No. 09/551,985 filed Apr. 15, 2000 and now U.S. Pat. No. 6,402,872 which is a continuation-in-part of U.S. patent application Ser. No. 09/126,010 field Jul. 29, 1998 and now U.S. Pat. No. 6,086,697.

The disclosures of these commonly owned and assigned applications and patents are hereby incorporated by reference.

The present application is also related to, and hereby incorporates by reference, the disclosures of the following commonly owned and assigned patents and patent applications: (i) U.S. patent application Ser. No. 08/627,786 filed Mar. 25, 1996 and now U.S. Pat. No. 5,809,674 issued Sep. 22, 1998 entitled "Apparatus and Method For Increasing An Effective Information Carrying Surface Area On A Container"; (ii) U.S. patent application Ser. No. 08/741,607 filed Oct. 31, 1996 and now U.S. Pat. No. 5,884,421 issued Mar. 23, 1999 entitled "Apparatus and Method for Constructing a Rotatable Label Device; (iii) U.S. patent application Ser. No. 09/187,299 filed Nov. 5, 1998 and now U.S. Pat. No. 6,129,802 issued Oct. 10, 2000 and entitled "Rotatable Label System and Method for Constructing the Same"; and (iv) U.S. patent application Ser. No. 09/247,245 filed Feb. 9, 1999 and now U.S. Pat. No. 6,385,878 issued May 14, 2002 and entitled "Rotatable label System Including Tamper-Evident Feature And Method For Constructing Same."

BACKGROUND OF THE INVENTION

1. Field of the Invention

The present invention relates generally to labels, and more particularly to a rotatable label system with an inner label surface and an outer rotatable label.

2. Description of Related Art

Many consumer products, such as vitamins, medications, and food items, are packaged in containers. It is usually desirable to display information in the form of written indicia arranged on the exterior surface of such containers to inform consumers as to the nature and use of the associated product. This information may include directions for use, warnings, dosage amounts, ingredients, company logos, and advertisements. Such information is conventionally printed on a label affixed to the container.

Prior art labels may have insufficient area available, however, to accommodate all of the information that a manufacturer may desire to provide to the consumer. Of course, the manufacturer may include all of the desired information on the label by reducing the size or typeface of some or all of the indicia, or by closely spacing the indicia. However, reduction of the size of text and/or graphics may adversely affect the visual appeal of the container, or may render some or all of the information illegible to the consumer. Furthermore, consumers may tend to ignore information presented in "fine print."

A manufacturer who wishes to provide a relatively large amount of information to the consumer may also opt to place some of the information on a separate sheet of paper (known as an "insert") packaged with the container. This technique is commonly employed in connection with health care items, such as over-the-counter medications and contact lens solutions. However, the insert is frequently lost or discarded after the initial use of the associated product, thus causing information set forth thereon to become unavailable to the consumer.

Thus, there is a need in the product packaging art for a system and method for increasing the amount of information that can be presented on a product container. There is a more specific need for a rotatable label system having an augmented surface area for presenting written information.

SUMMARY OF THE INVENTION

The present invention relates to a rotatable label system having a rotatable outer label which effectively increases indicia surface area. The rotatable label system generally comprises a container for holding a quantity of a consumer or other type product and a label or shell disposed about an exterior of the container and conforming thereto. In exemplary embodiments, the present invention discloses a label system for application to the container or other object comprising an inner label having front and rear surfaces and leading and trailing ends. The present invention further comprises an adhesive disposed on the rear surface of the inner label for adhering the inner label to the container or itself. Further, the present invention provides an outer label having an adhesive only on a rear surface at or near a trailing end of the outer label for adhering the outer label to a corresponding front surface of the outer label such that the outer label is secured about the container but rotatable about the inner label.

The method comprises providing an inner label and an outer label, each label having front and rear surfaces and leading and trailing ends; providing an adhesive on the rear surface of the inner label for fixedly mounting the inner label to the container; providing an adhesive on the rear surface of the outer label for adhering the outer label to itself to allow the outer label to freely rotate around the inner label. Also provided is a transparent portion formed in the outer label so that the written indicia disposed on the front surface of the inner label is viewable through the transparent portion of the outer label.

BRIEF DESCRIPTION OF THE DRAWINGS

For a more complete understanding of the invention, reference may be had to the following detailed description of the invention in conjunction with the drawings wherein.

DETAILED DESCRIPTION OF EXEMPLARY EMBODIMENTS

Figure 1:
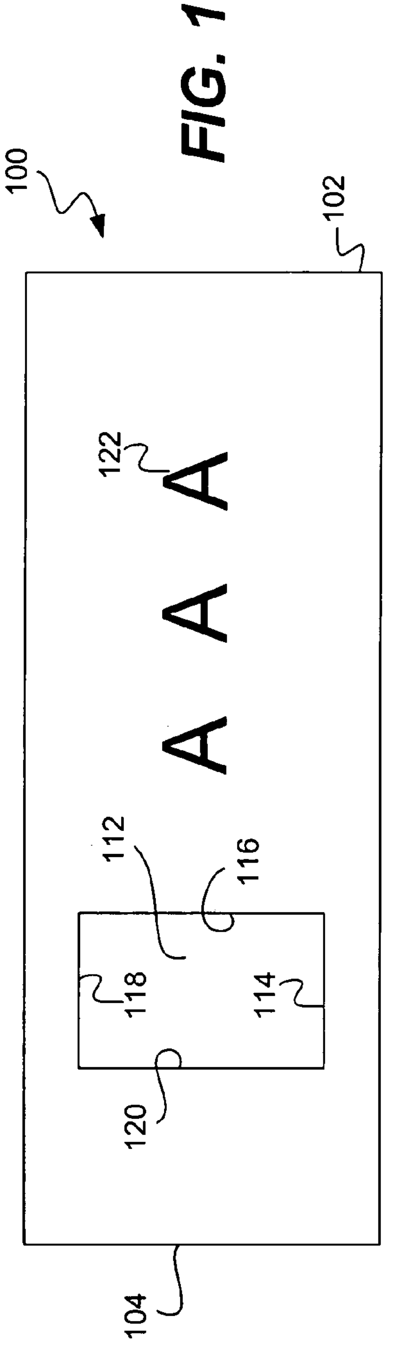
FIG. 1 is a plan view of a front surface of an outer label in accordance with the present invention.

FIG. 1 illustrates a front surface of an exemplary outer label or shell 100 according to principles of the present invention. As shown, the outer label 100 comprises a leading end 102 and a trailing end 104. The outer label 100 further comprises a transparent portion 112. The transparent portion 112 is illustrated as being defined by edges 114, 116, 118, and 120. The transparent portion 112 may comprise an open window with no material disposed between edges 114–120; or, alternatively, the transparent portion 112 may comprise a transparent film or the like to permit viewing through the transparent portion 112. As discussed in more detail below, the transparent portion 112 permits an exterior of an underlying container or an underlying inner label, to be viewed through the outer label 100. FIG. 1 also shows writing or other indicia 122 that may comprise outer label messages such as trademarks, contents, usage instructions, and so forth.

In exemplary embodiments, the transparent portion 112 permits a user to view an underlying subset of indicia disposed on the inner label affixed to the container. The user or consumer selects which subset of indicia he or she wishes to view by rotating the rotatable outer label 100 about a central axis of the container such that the selected subset of indicia appears within the transparent portion 112. As depicted in the figures herein, the written indicia may include several subsets (e.g., product information, ingredients, and the like) circumferentially arranged on the inner label, each subset being selectively viewable by the user.

Figure 2:
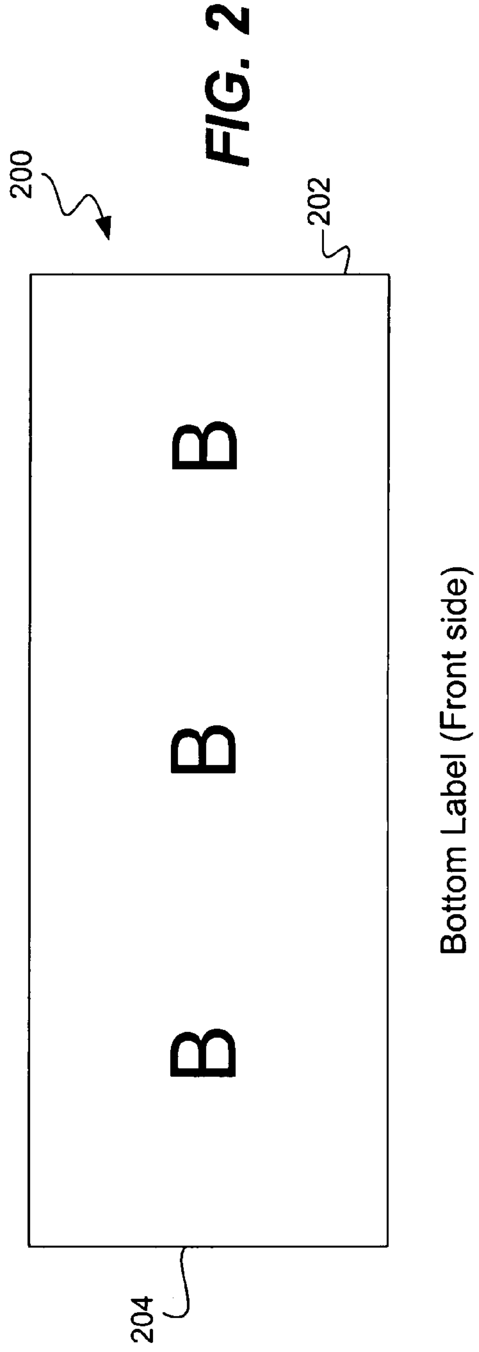
FIG. 2 is a plan view of a front surface of an inner label in accordance with the present invention.

FIG. 2 illustrates a front surface of an exemplary inner label 200. The inner label 200 comprises a leading end 202 and a trailing end 204. In the present embodiment, the inner label 200 is slightly narrower than the outer label 100 of FIG. 1. As will be seen and described in later figures, the inner label 200 is more or less fixedly mounted to a container, while outer label 100 is intended to be movably constructed and mounted over the inner label 200. In further embodiments, a narrower width of the inner label 200 prevents the inner label 200 from being seen extending out from the edges of the outer label 100. Further, the inner label 200, in some embodiments, is shorter than outer label 100.

Figure 3:
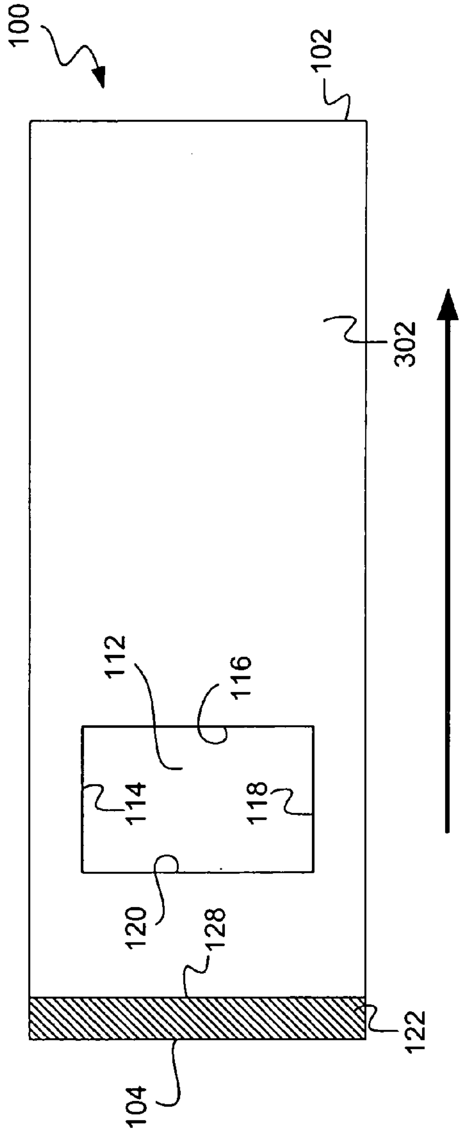
FIG. 3 is a plan view of a rear surface of the outer label of FIG. 1.

FIG. 3 shows an exemplary backside of the outer label 100. The leading end 102 and trailing end 104 are seen in this figure as well. Transparent portion 112 and the edges 114, 116, 118, and 120 of the transparent portion 112 are also seen in FIG. 3. In one embodiment, a strip of adhesive 122 is disposed on a rear surface 302 of the outer label 100 adjacent to the trailing end 104 and is further defined by edge 128. Advantageously, with the exception of the strip of adhesive 122, the rear surface 302 of outer label 100 is substantially non-adhesive. As is discussed in more detail below, adhesive strip 122 secures the trailing end 104 of the outer label 100 to the leading end 102 when it is mounted over the inner label 200 (FIG. 2). The size of the adhesive strip 122 may be altered depending on design specifications. Further, the outer label 100 may be slightly longer than the inner label 200, such that the adhesive edge or strip 122 has enough room, as the outer label 100 is wrapped around the container, to adhere only to or near the leading end 102 of the outer label 100. Resultantly, the outer label 100 is rotatably affixed about the container.

Figure 4:
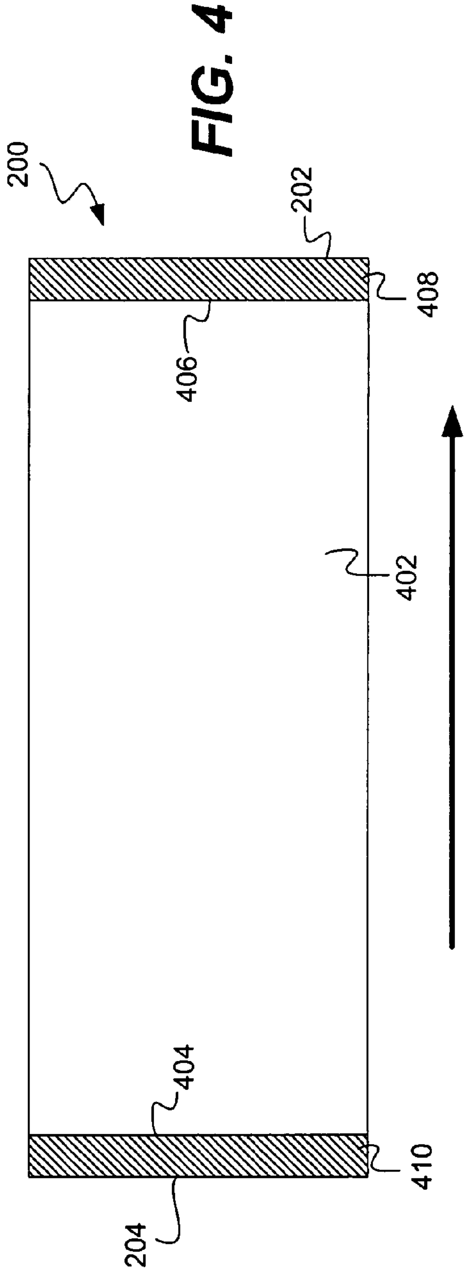
FIG. 4 is a plan view of a rear surface of the inner label of FIG. 2.

FIG. 4 illustrates a rear surface 402 of the inner label 200. In one embodiment, the rear surface 402 has two strips of adhesive 408 and 410 on or immediately adjacent to the leading and trailing ends, 202 and 204, respectively. Adhesive strip 408 has an edge 406 defined as its limit on the inner label 200, and adhesive strip 410 has its defining edge 404, as well. As set forth above, the inner label 200 is usually narrower than the outer label 100 so that the edges of the inner label 200 are not visible above or below the upper and lower edges of the outer label 100. Further, the outer label 100 may be longer than the inner label 200 such that the trailing end 104 of the outer label 100 can be attached to or near the leading end 102 by the use of the adhesive strip 122.

Figure 5A:
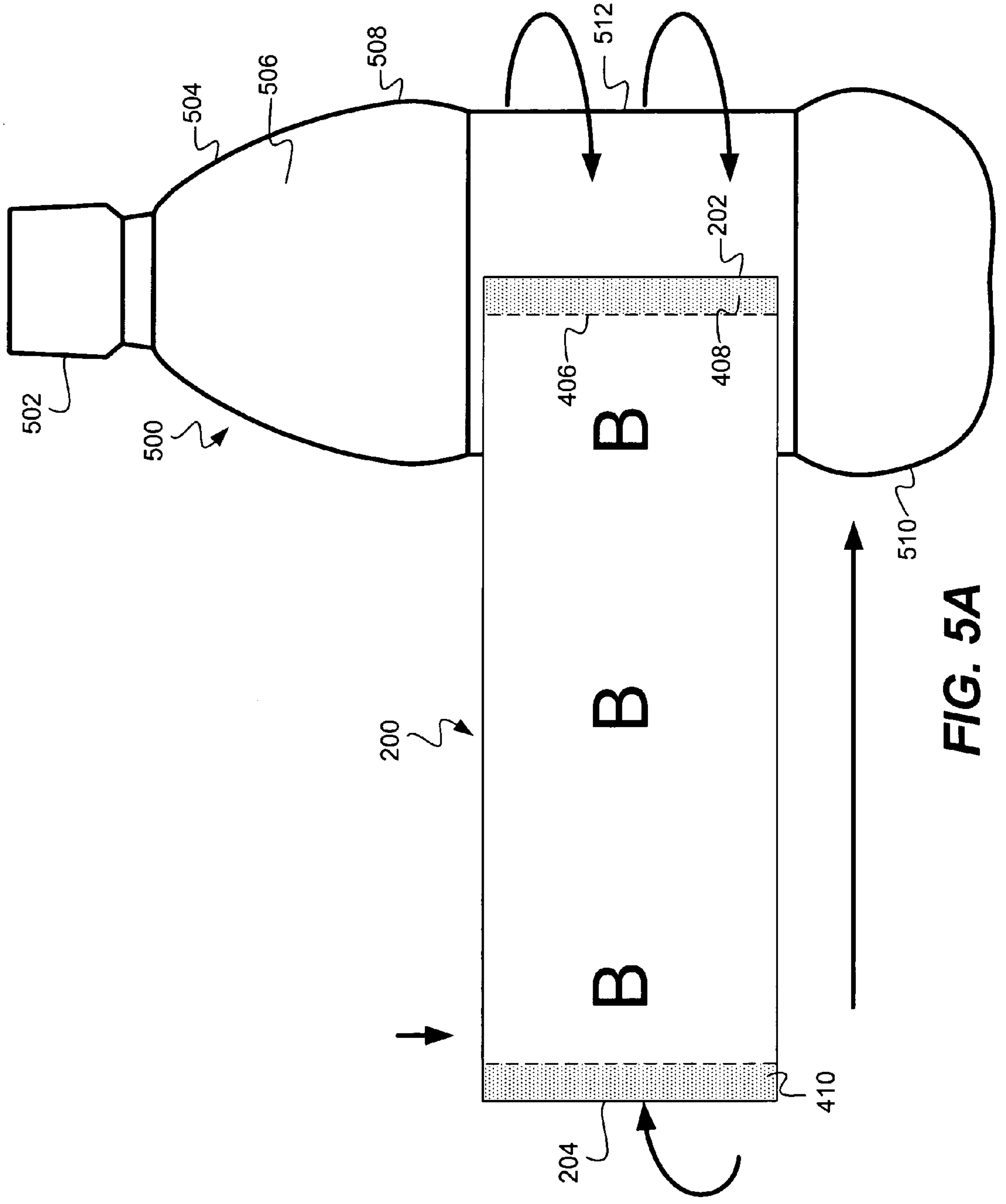
FIG. 5*a* illustrates the inner label of FIG. 4 partially wrapped about a container in accordance with the present invention.

FIG. 5*a* illustrates the application of the inner label 200 to an exemplary container 500. Such a container 500 may be a glass or plastic bottle, or other type of container such as a metal can or cardboard receptacle. FIG. 5*a* shows the container 500 as having a cap 502 removably secured to an exemplary body 504. In one embodiment, the exemplary body 504 has an exterior surface 506 that comprises a top label panel 508, a bottom label panel 510, and a recessed surface 512 interposed between the top label panel 508 and bottom label panel 510. As discussed below, the inner label 200 is applied to the container 500 at the recessed area 512 between the top label panel 508 and a bottom label panel 510.

After the outer label 100 and inner label 200 are secured about the container 500, the top and bottom label panels 508, 510 limit the longitudinal displacement of the outer label 200 relative to the container 500. As will be seen below, limiting the longitudinal displacement of the outer label 100 on the container 500 prevents the outer label 100 from slipping off the container 500. Other label holding means are contemplated, such as rims, seams, ridges, etc.

For the embodiment in FIG. 5*a,* the length of the inner label 200 is longer than the circumference of the recessed surface 512 of the container 500. That is, when the inner label 200 is wrapped around the container 500, the inner label 200 will, via rear adhesive strip 410, overlap and adhere to the leading end 202 of inner label 200. The adhesive strip 408 is utilized to initially adhere the inner label 200 to the container 500. Adhesive surface strips 408 and 410 are shown in dotted line phantom view because the adhesive is actually on the reverse side of the inner label 200 and would not normally be seen in this view except in dotted line fashion.

Figure 5B:
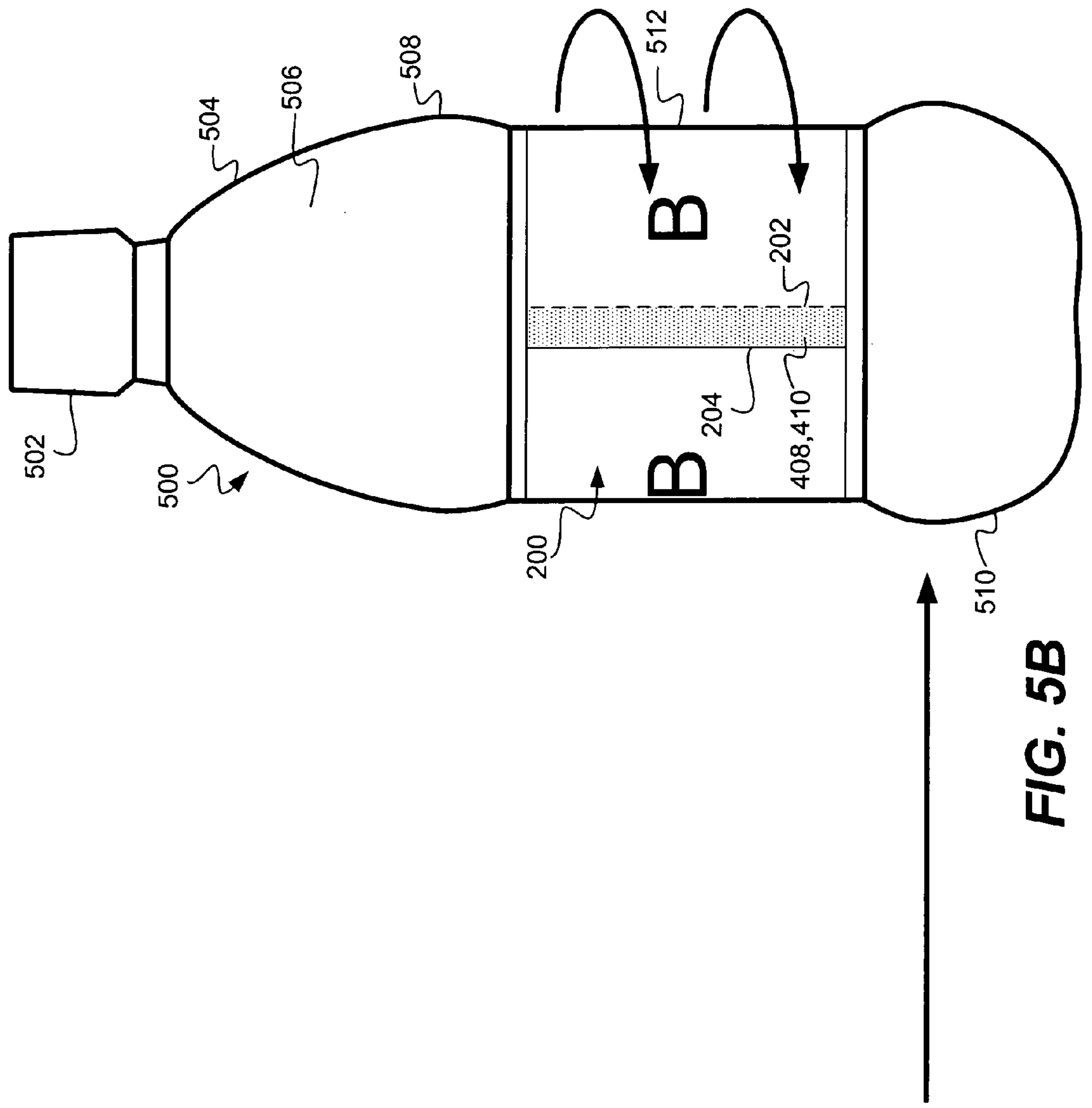
FIG. 5*b* illustrates the inner label of FIG. 4 secured about a container in accordance with the present invention.

FIG. 5*b* shows the container 500 with the inner label 200 mounted to the container 500. Initially, as seen in FIG. 5*a*, leading end 202 is placed on the recessed surface 512 of the container 500 and affixed to the container 500 by means of the adhesive 408. With relative motion between the container 500 and inner label 200, the inner label 200 would be wrapped around the container 500 with the trailing end 204 now overlapping the leading end 202 such that adhesive 408 holds the leading end 202 to the container 500 while adhesive 410 holds the trailing end 204 to the overlapped leading end 202 of the inner label 200. In alternative embodiments, the adhesive 408, 410 may be applied to more of the rear surface 302 (FIG. 3), such as for example, over the entire rear surface 302. In a further embodiment, the adhesive 410 holds the trailing end 204 to both the leading end 202 and the container 500 concurrently.

Figure 6A:
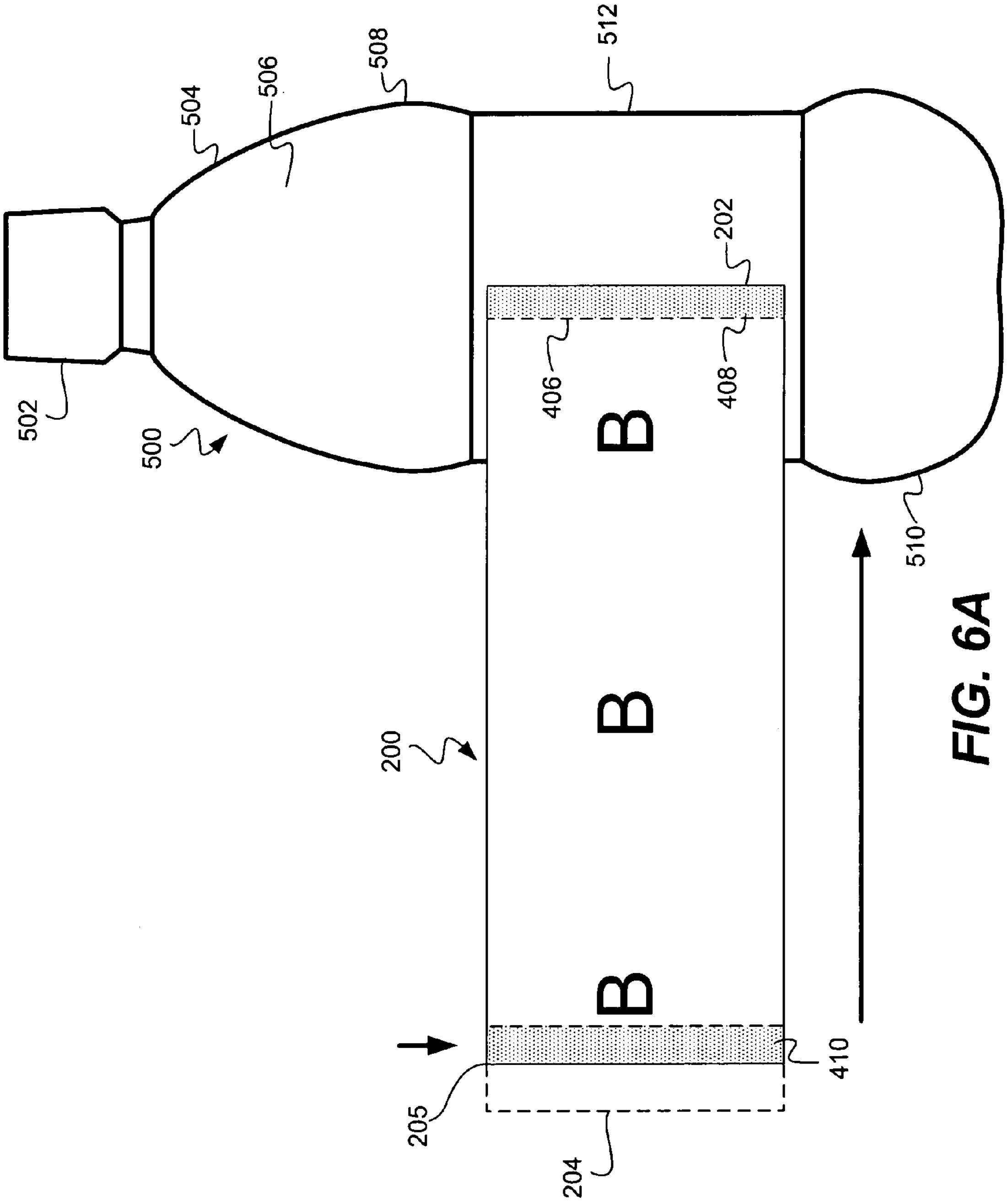
FIG. 6*a* illustrates a shorter inner label of FIG. 4 partially wrapped about a container in accordance with the present invention.

FIG. 6*a* is similar to the embodiment shown in FIG. 5*a*. FIG. 6*a* shows the container 500 with the removable cap 502 and the container body 504 which comprises the exterior surface 506, including the top label panel 508, the bottom label panel 510, and the recessed surface 512 in between the top label panel 508 and the bottom label panel 510. The inner label 200 is also shown in the same position for mounting on the recessed surface 512 of the container 500 with the leading end 202, leading adhesive strip 408, trailing adhesive strip 410, and shortened trailing end 205 of the inner label 200. The shorter trailing end 205 allows for inner label 200 to be approximately a length equaling a circumference of the recessed surface 512 of the container 500. Since the length of inner label 200 and the circumference of container 500 at its recessed surface 512 are equal, the inner label 200, when wrapped around the recessed surface 512, will not overlap, but the leading end 202 and the trailing end 205 will abut together. The original length, as described in conjunction with FIG. 5*a*, is now shown with its trailing end 204 in dotted line fashion to illustrate the shortening of the inner label 200 to shorter trailing end 205. As in FIG. 5*a*, the adhesive 408 and 410 are shown in phantom dotted line fashion because the adhesive 410 is actually on the rear side not seen in this figure.

Figure 6B:
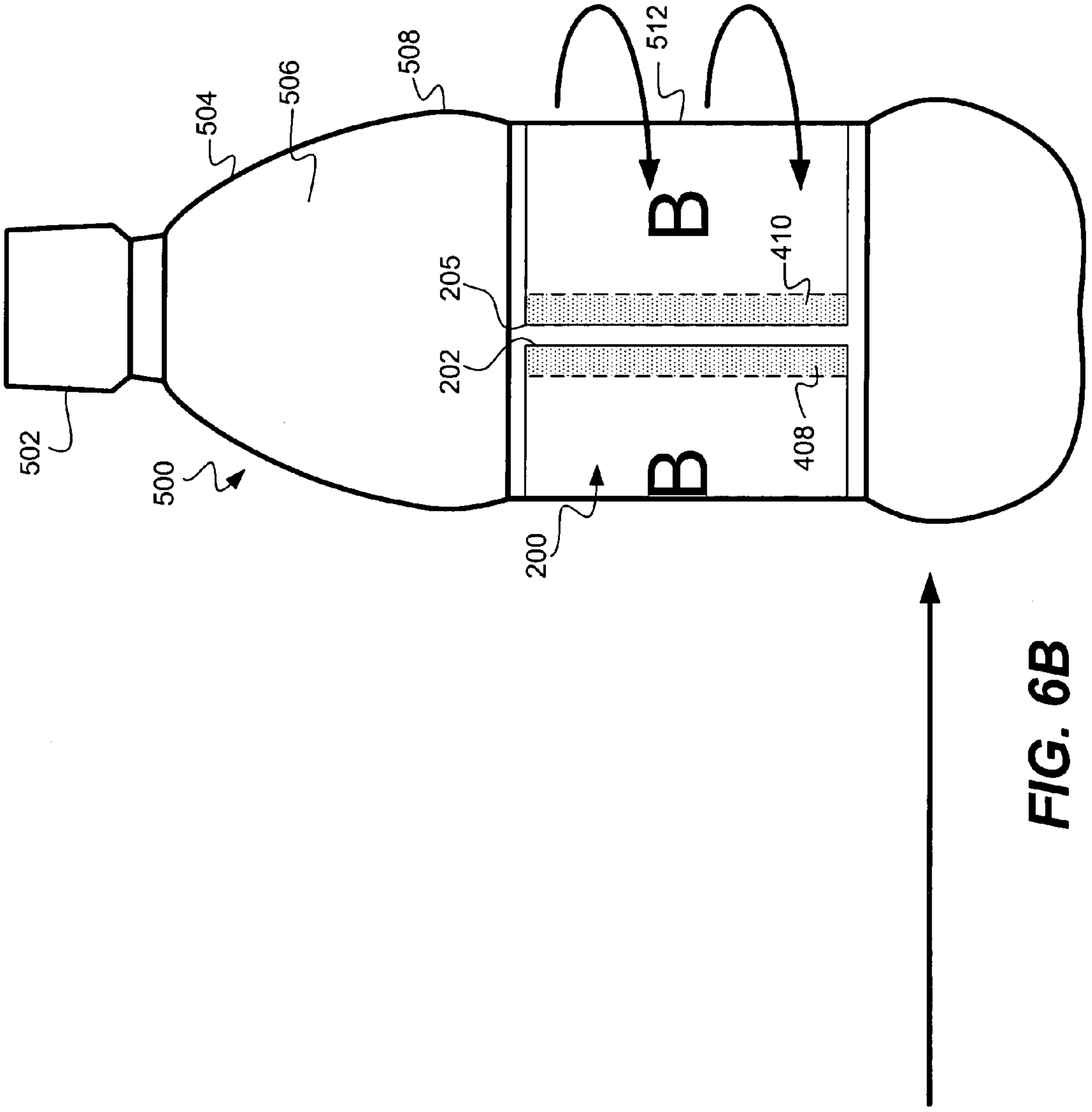
FIG. 6*b* illustrates a shorter inner label of FIG. 4 secured about a container in accordance with the present invention.

FIG. 6*b* shows the inner label 200 wrapped around the bottle or container 500. As set forth above, the length of the inner label 200 may be the length of the circumference of the recessed surface 512 of the container 500, which will allow the leading end 202 and the shorter trailing end 205 to abut one another. However, it is also possible that the inner label 200 could be shorter than the circumference of the recessed surface 512 of the container 500 which would provide for a gap between the leading end 202 and the trailing end 205 of the inner label 200. In this instance, the adhesive 408 on the leading end 202 would adhere to the exterior surface 506 as does the adhesive 410 on the shorter trailing end 205. In alternative embodiments, the adhesive 408, 410 may be applied to more of the rear surface 302 (FIG. 3), such as for example, over the entire rear surface 302.

Figure 7A:
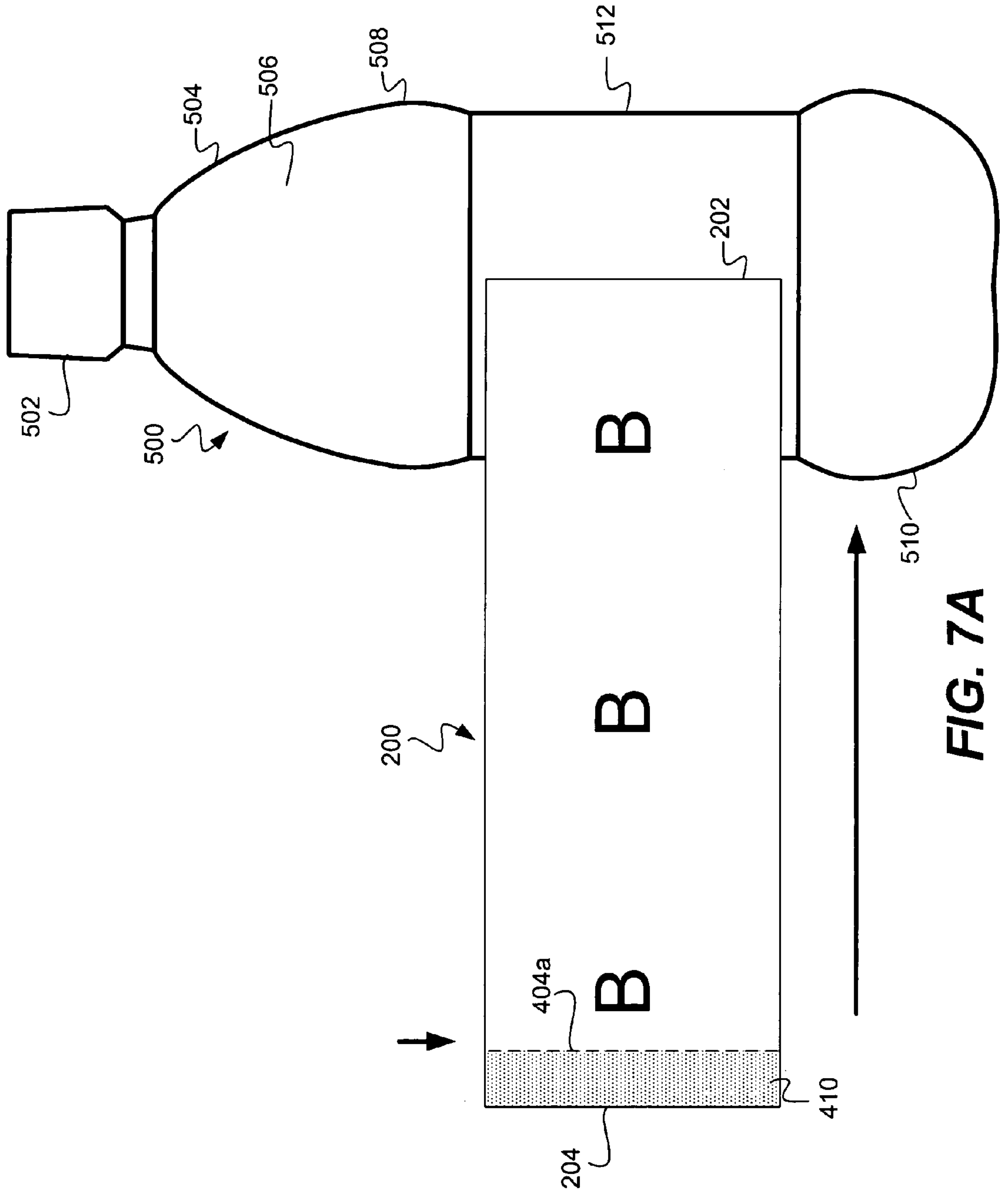
FIG. 7*a* illustrates the inner label of FIG. 4 with a wider adhesive strip partially wrapped about a container in accordance with the present invention.

Referring now to FIG. 7*a*, an embodiment of FIG. 7*a* is similar to that of the embodiment of FIG. 6*a*. In this embodiment, however, the inner label 200 does not have a forward edge adhesive with which to hold the inner label and/or the leading end 202 in place while the inner label 200 is wrapped around the recessed surface 512 of the container 500, as was shown in previous figures. However, the trailing end 204 now has a strip of adhesive larger (wider) than the previous strips of adhesive so that when the inner label 200 is wrapped around the recessed surface 512 of the container 500, the label section defined between the trailing end 204 and the edge 404*a* will contact and adhere to the leading end 202 of the inner label 200 as well as contacting the recessed surface 512 of the container 500.

In this embodiment, extraneous means could be used to hold the inner label 200 and/or the leading end 202 of the inner label 200 to the container 500. For example, a blast of air or other gas against the leading end 202 could be used to hold the inner label against the container 500 until the inner label 200 is wrapped completely around the recessed surface 512 of the container 500 and the adhesive 410 can be used to affix the inner label 200 to the container 500. Moisture, such as a small amount of water, could be used to temporarily couple the inner label 200, for example at the leading end 202, to the container 500 until the entire inner label 200 is wrapped about the container 500. Of course, the moisture will quickly evaporate leaving no evidence of its use. Alternatively, a hold or pressing apparatus could be used in the wrapping mechanism itself to hold the inner label 200 in place until the inner label 200 is completely wrapped about the container 500. Further techniques can comprise supplying a vacuum pressure, or a static electric charge pressure to the inner label 200. Similar techniques may be used to apply the outer label 100 about the inner label 200.

Figure 7B:
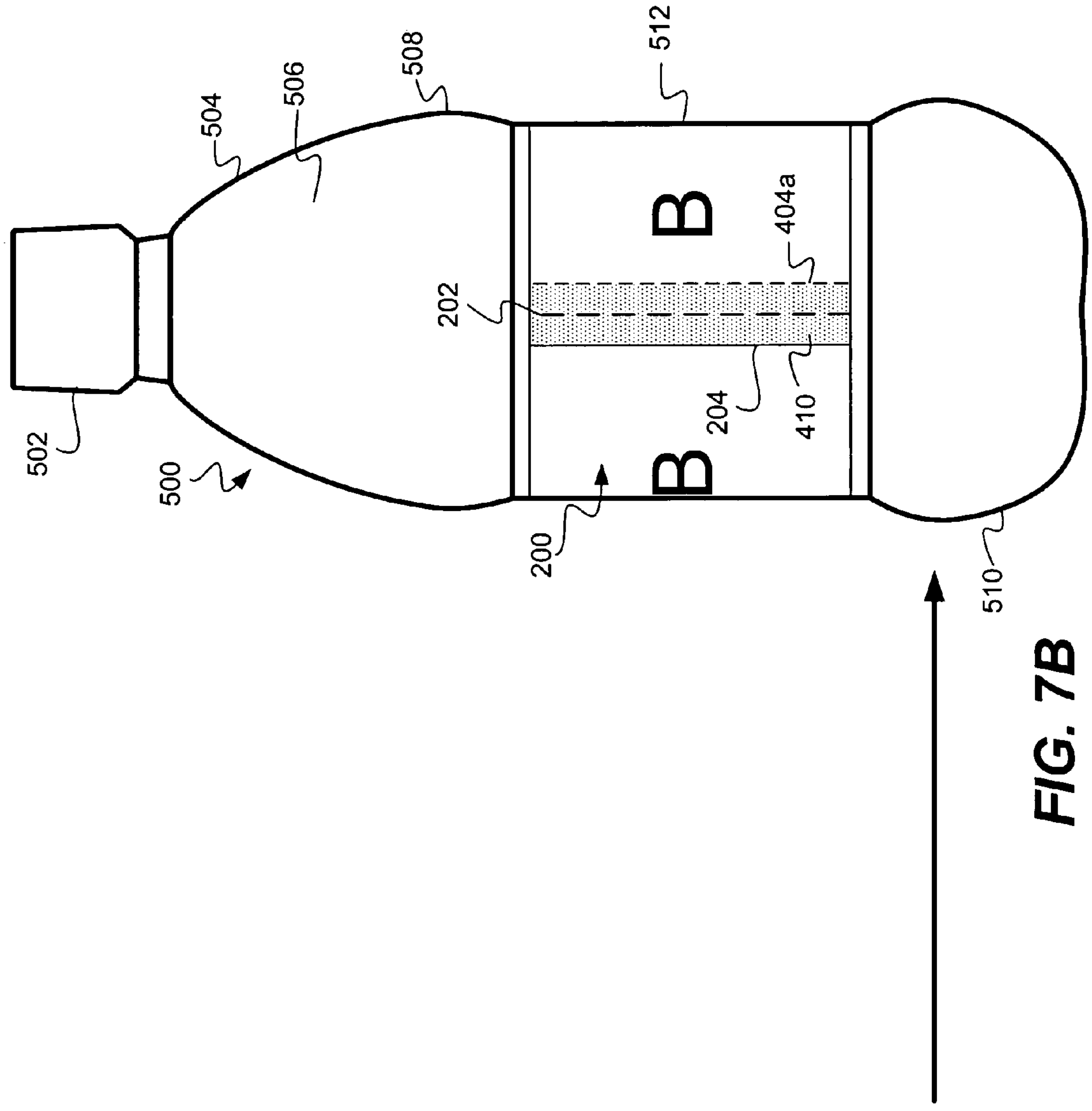
FIG. 7*b* illustrates the inner label of FIG. 4 secured about a container in accordance with the present invention.

FIG. 7*b* shows the container 500 with the overlapping inner label 200 where the adhesive strip 204 on the trailing end 204 is wider than the overlapping section of the inner label 200 such that the adhesive 410 contacts not only the outer edge of the leading end 202 of the inner label 200 but also contacts the recessed surface 512 of container 500. In the previous figures, when the leading end 202 overlaps the trailing end 204 with the adhesive only contacting the leading end 202 of the inner label 200, such as in FIG. 5*b*, it is possible for inner label 200 to move with respect to the surface of container 500 (e.g., if the leading end 202 does not have adhesive). This is undesirable in some instances; and the embodiment shown in FIG. 7*b* is provided so that once the inner label 200 is mounted to the container 500, the adhesive strip portion 410 which is wider than the overlapping sections of the inner label 200 which allows the inner label 200 to be fixedly mounted to the bottle or container 500. The adhesive on the trailing end 204 contacts the surface of the container 500 and prevents the inner label 200 from moving circumferentially around the container 500.

Figure 8:
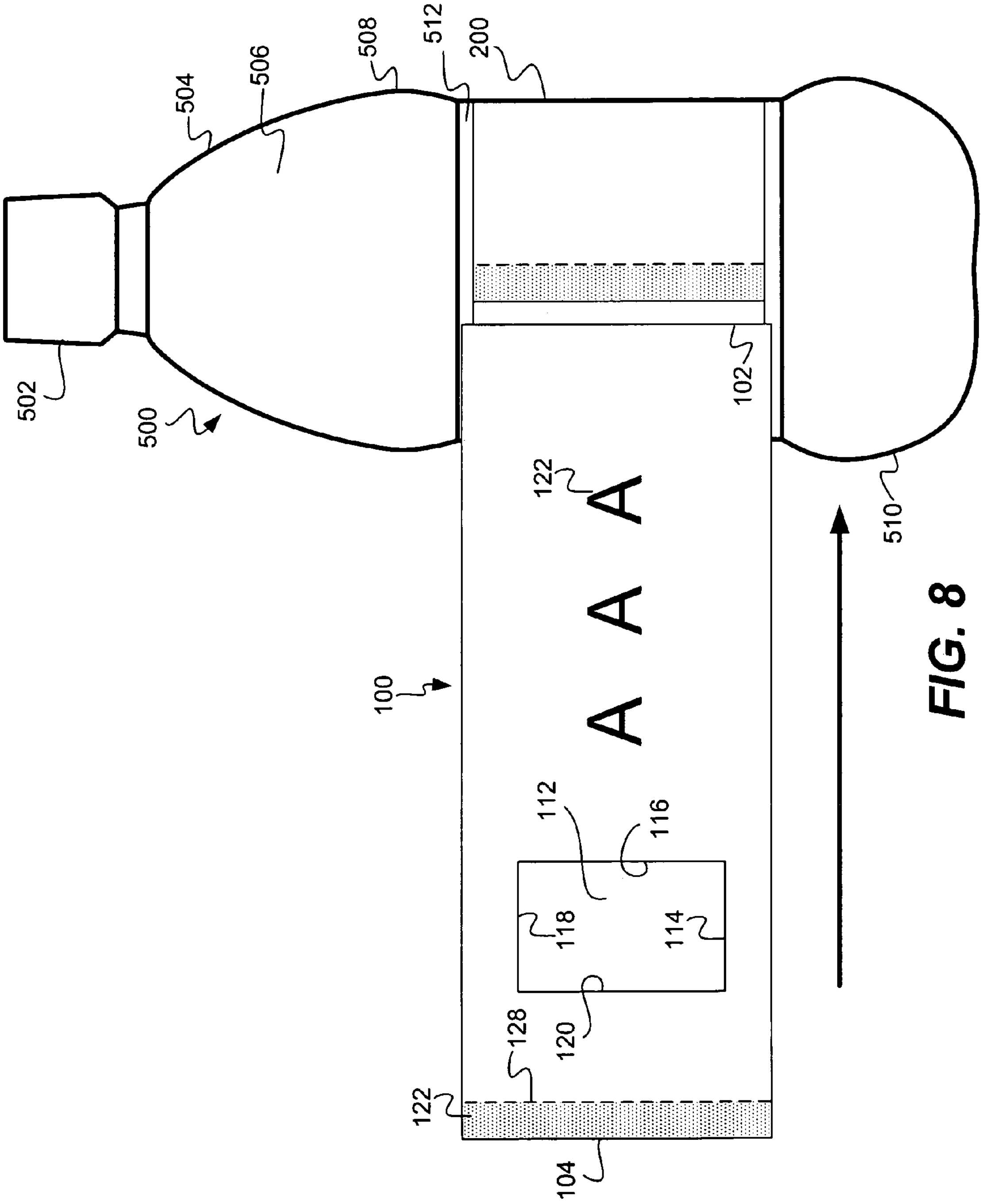
FIG. 8 illustrates the outer label of FIG. 3 partially wrapped about a container in accordance with the present invention.

FIG. 8 shows the container 500 with the inner label 200 already mounted to the recessed surface 512 of the container 500. In this embodiment, it is desirable to mount the outer label 100 over the inner label 200 on the container 500. It is clearly shown in this figure that outer label 100 is wider than inner label 200 so that if there is any slight longitudinal movement of the outer label 100 within the recessed surface 512, none of the inner label 200 will be viewable by a user or consumer of the contents of the container 500. The outer label 100 is the label seen and described above in reference to FIG. 3. That is, the outer label 100 has a leading or front end 102 and a trailing or second end 104. There is a transparent portion 112 defined by edges 114, 116, 118, and 120. Also shown is adhesive strip 122 illustrated in dotted or dashed phantom line because the adhesive is actually on the rear, non-viewable, surface of outer label 100.

As described in more detail in connection with FIG. 7*a*, various techniques may be used to temporarily coupled the outer label 100 to the inner label 200 or the container 500. Such techniques comprise a blast of air of gas against the outer label 100 (e.g., at or near the leading end 102), moisture applied to the outer label 100 (e.g., at or near the leading end 102), vacuum pressure, and static electric charge pressure. Other methods for temporarily positioning or coupling the outer label 100 may also be used.

In exemplary embodiments when there is relative motion between the container 500 and the outer label 100, the outer label 100 will wrap around the recessed surface 512 of the container 500. By relative motion, it is meant that the outer label 100 is maintained stationary and the container 500 is rotated along a line in order to wrap the outer label 100 about the container 500. Alternatively, the container 500 may remain stationary and the outer label 100, by manufacturing means known in the art, wraps around the recessed surface 512 of the container 500. Yet another embodiment may be a combination of the two above-described motions. Similar methods may be used to apply the inner label 200.

Once the outer label 100 is completely wrapped about the container 500, the adhesive 122 on the trailing end 104 will contact and form a bond with the front surface of the leading end 102. Because the trailing end 104 overlaps the leading end 102 of the outer label 100, the adhesive 122 will not contact the inner label 200 or the container 500. By having the trailing end 104 only adhering to the leading end 102, the outer label 100 is free to rotate about the inner label 200 and the container 500 once the temporary coupling is removed.

Figure 9:
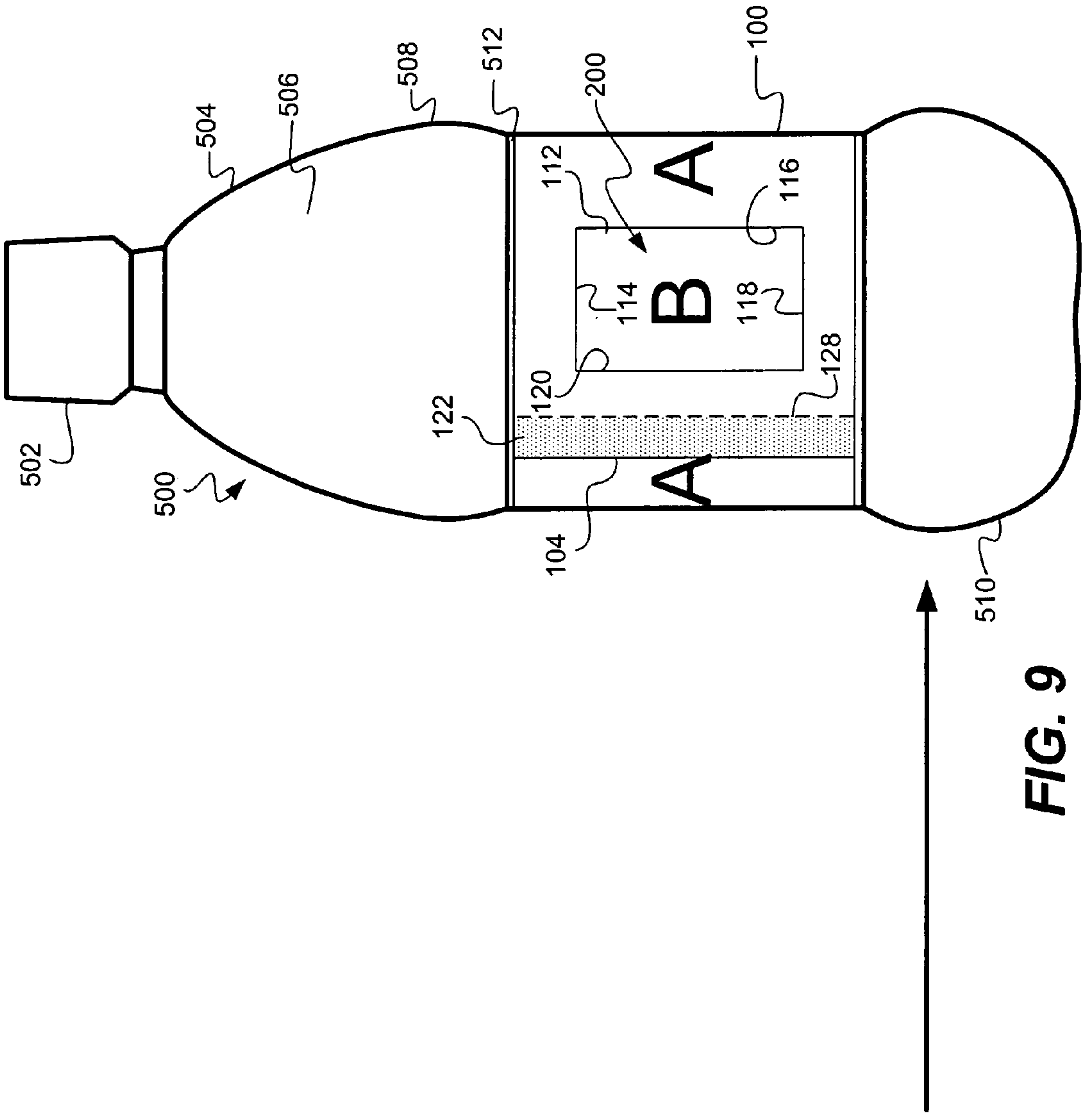
FIG. 9 illustrates the outer label of FIG. 3 secured about a container in accordance with the present invention.

FIG. 9 shows the outer label 100 disposed around the center recessed surface 512 of the container 500 with the adhesive 122 on the trailing end 104 adhering to the leading end 102 (not shown in this figure); thus positioning the outer label 100 about the inner label 200. In this figure, for the first time, one can see the relationship between the inner label 200 and the outer label 100. With the inner label 200 affixed to the container 500, and the outer label 100 movably disposed about the inner label 100 but allowed to move circumferentially about the inner label 100 along the recessed surface 512, the transparent portion 112 in the outer label 100 allows any writing or other indicia on the inner label 200 to be seen through the transparent portion 112 of the outer label 100. As the outer label 100 is rotated about an axis of the container 500, different portions of the underlying inner label 200 come into view through the transparent portion 112 of the outer label 100.

Figure 10:
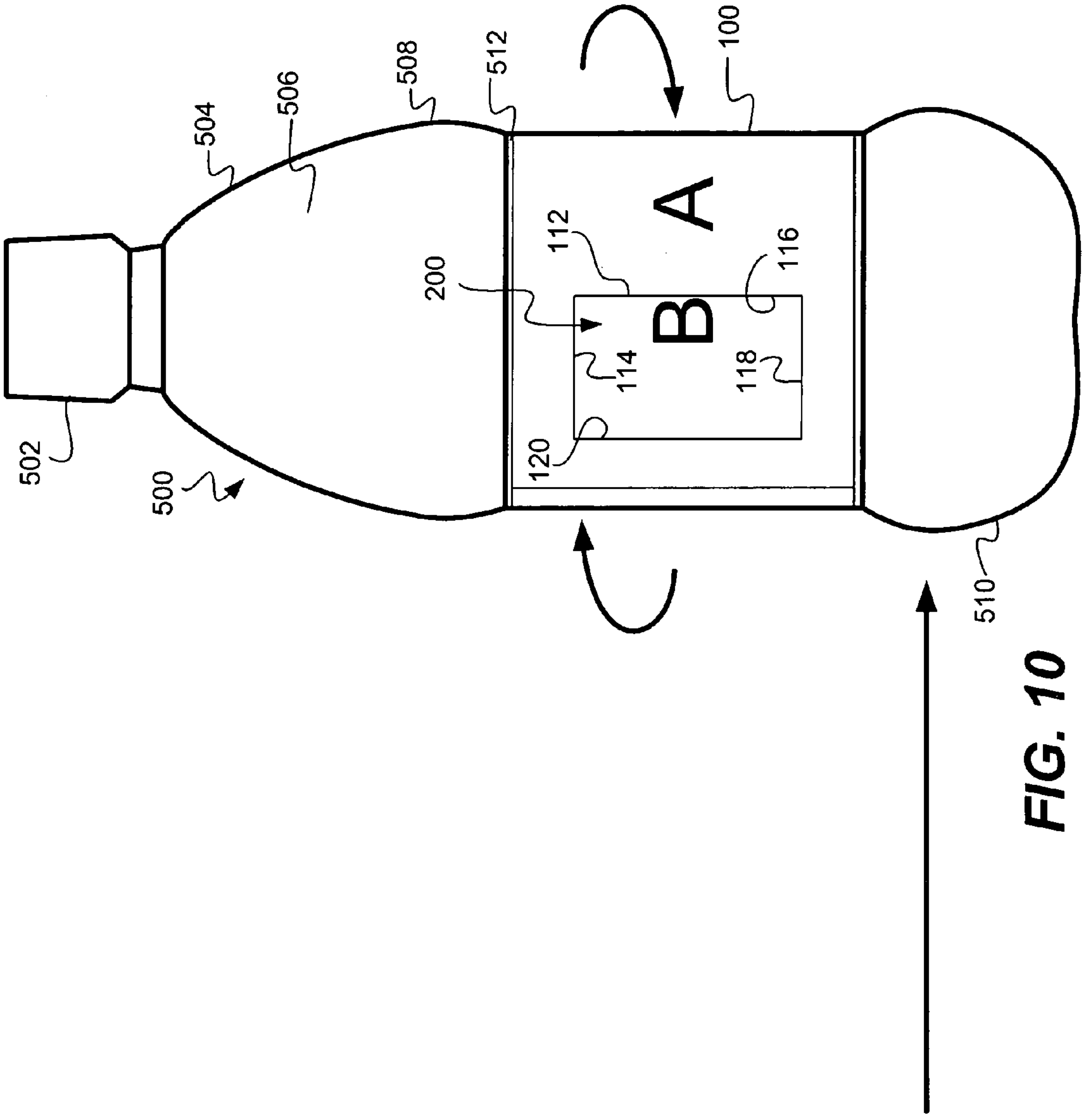
FIG. 10 illustrates the outer label beginning to be rotated about the circumference of the container over the inner label.

The motion of the outer label 100 is seen now in FIG. 10. If the outer label 100 is moved in a clockwise direction as viewed from the top of the container 500, then the right edge 116 of outer label 100 will begin to eclipse the writing underneath as shown by the clipping of the right edge 116 of the letter 'B', which is representative of the information printed on the inner label 200. Of course, the outer label 100 may also be moved in a counter clockwise direction as viewed from the top of the container 500, at the choice of the consumer or user of the container 500.

Figure 11:
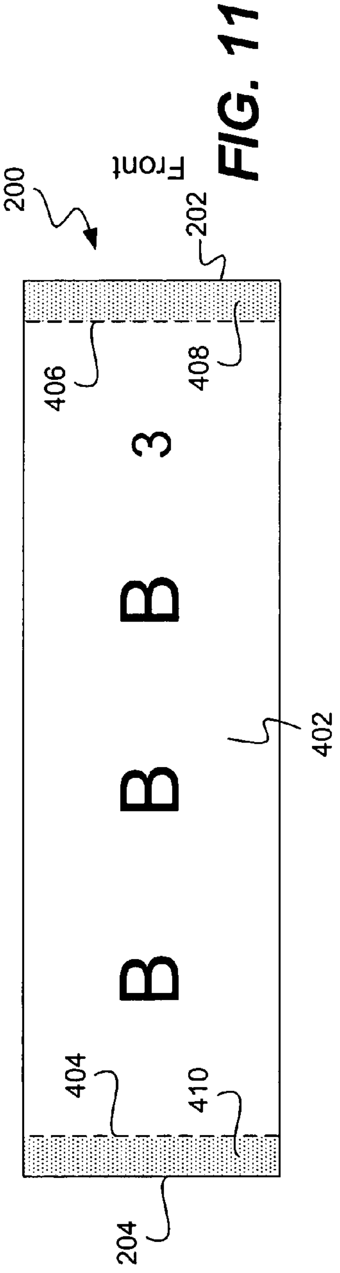
FIGS. 11, 12, and 13 depict three embodiments of inner labels in accordance with the invention.
Figure 12:
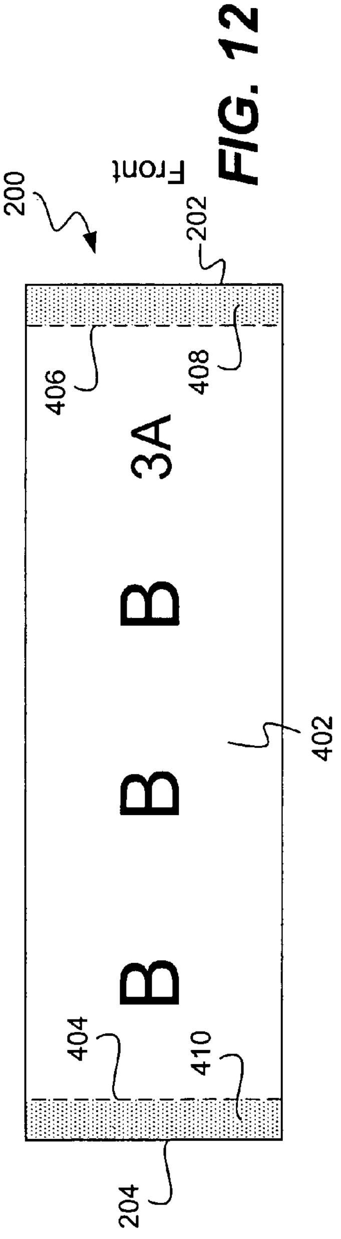
Figure 13:
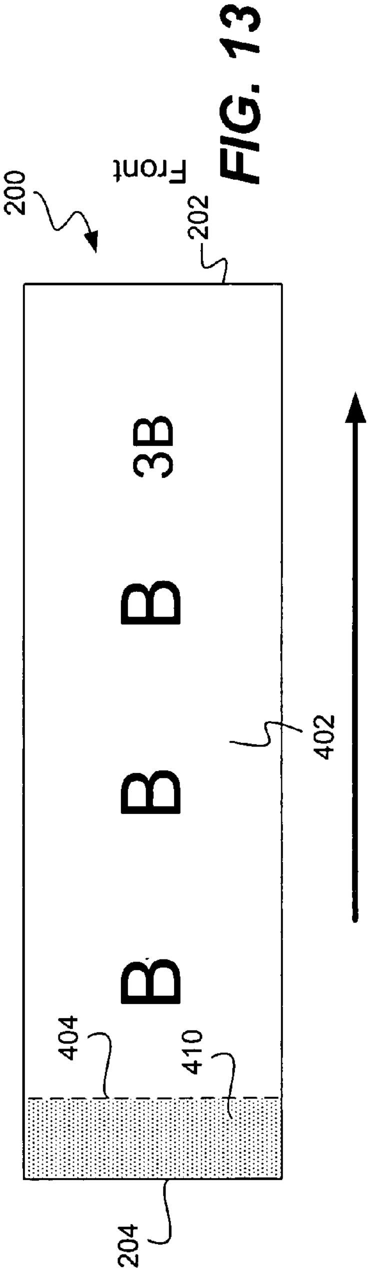

In FIGS. 11, 12, and 13 are rear surface views of the various inner labels as previously described in conjunction with the drawings. FIG. 11 shows the inner label 200 with the leading end 202 and the trailing end 204 with the adhesive 408 adjacent to the leading end 202, and the adhesive 410 adjacent trailing or second end 204. FIG. 12 shows the same inner label 200 except that it is slightly shorter and is used in conjunction with the embodiment as shown in FIG. 6*b* as described above. FIG. 13 shows the inner label 200 with the extra wider adhesive 410 for use in the overlapping embodiment of the inner label 200 as shown and described in conjunction with FIG. 7*b*.

Figure 14:
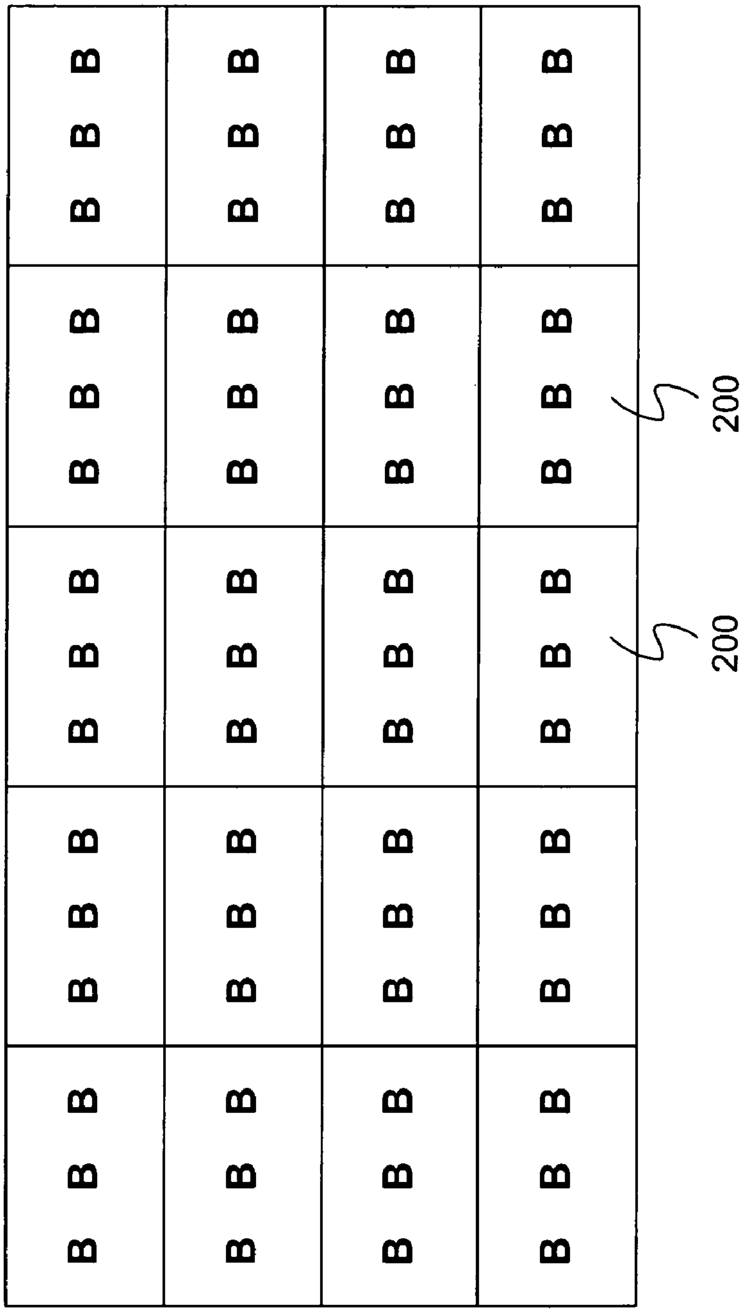
FIG. 14 is a plan view of inner labels being manufactured prior to cutting into strips of individual inner labels.

FIG. 14 illustrates one embodiment of a plurality of the inner labels 200 being manufactured. Shown in FIG. 14 are four rows of the inner labels 200 laterally adjacent one another. The length of the material upon which the inner labels 200 are printed depends upon how much material is available and the complexity and capacity of the manufacturing apparatus itself. The printed material shown schematically as the letters 'B' on FIG. 14 could be printed by any method; but a typical method of printing could utilize the Flexography method of printing, as is well known in the art. The material itself could comprise biaxially oriented polypropylene, well-known as BOPP. The inner labels 200 have a length or distance as determined by whether the apparatus is manufacturing labels set forth in FIGS. 11, 12, or 13, with concomitant lengths thereof.

Figure 15:
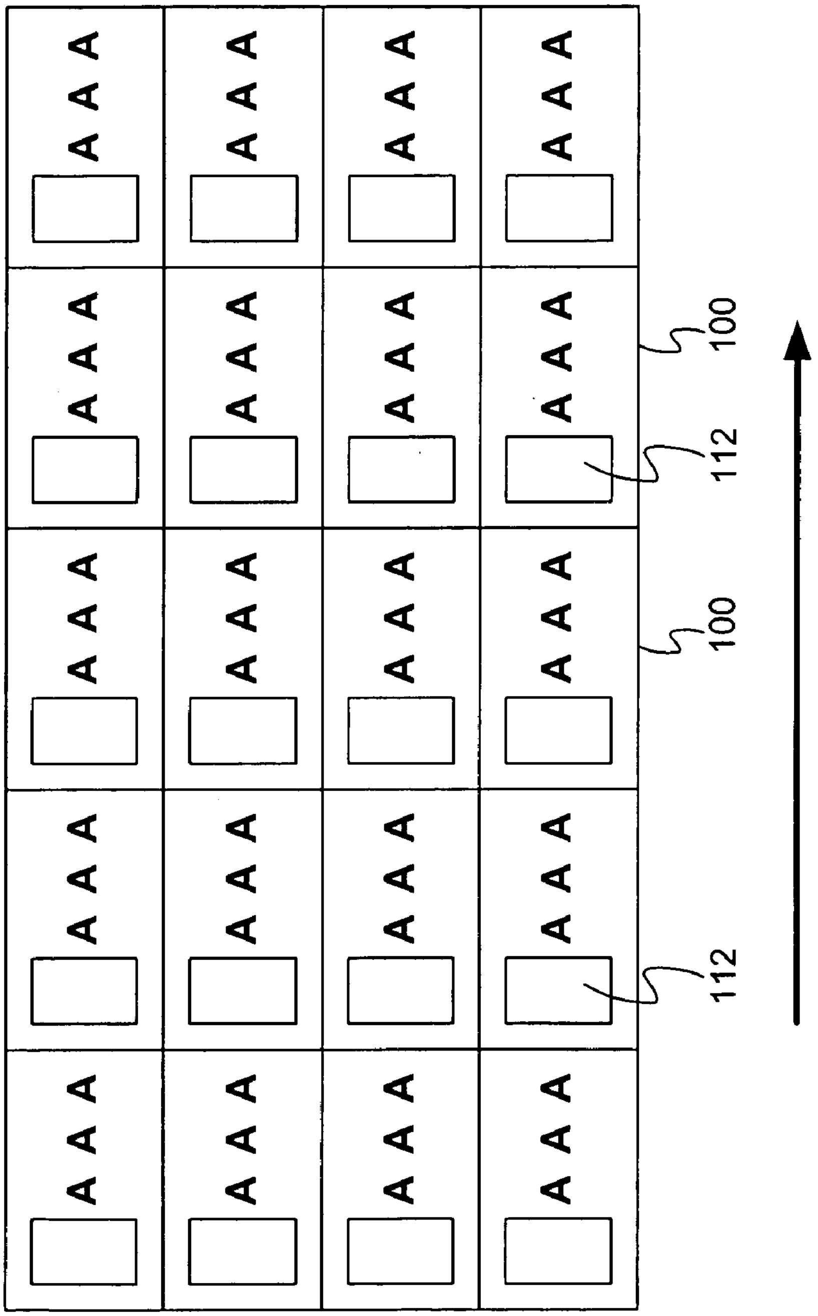
FIG. 15 is a plan view of outer labels being manufactured prior to cutting into strips of individual outer labels.

FIG. 15 shows a makeup of material used to make the outer labels 100 with the leading and trailing ends and appropriate adhesives depending upon the embodiment shown and to be manufactured. Also shown in FIG. 15 are transparent portions 112 in the outer labels 100 used for viewing the printed material on the inner labels 200 such as the letters 'B' as shown and described above in conjunction with FIG. 14. As set forth above, the transparent portion 112 of the outer label 100 could be an actual opening cut into the material or an area left transparent depending upon how the remaining part of the labels are printed and developed utilizing, for example, the Flexography technique. Similar to the inner labels 200 in FIG. 11, the outer labels 100 could also be made of biaxially oriented polypropylene, well known as BOPP.

Figure 16:
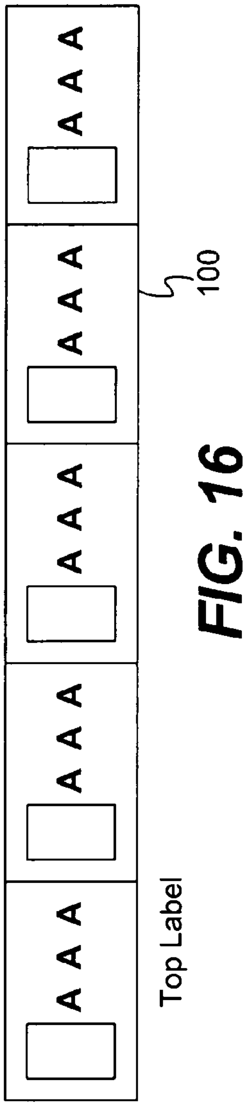
FIG. 16 is a plan view of a strip of outer labels of FIG. 15.
Figure 17:
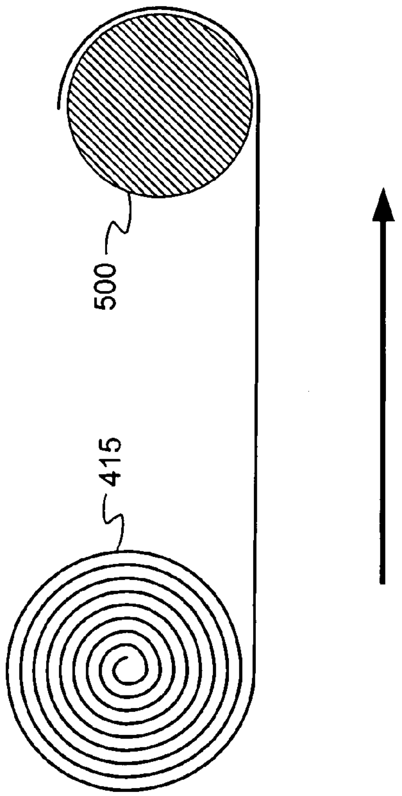
FIG. 17 is a schematic side view of inner or outer labels partially wrapped about the circumference of a container.
Figure 18:
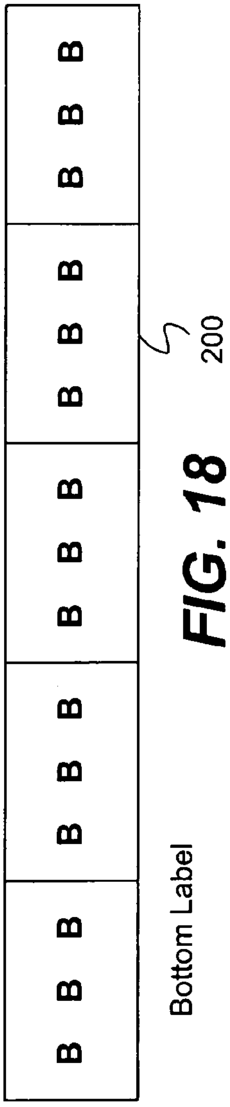
FIG. 18 is a plan view of a strip of inner labels of FIG. 14 in accordance with the invention.

FIG. 16 shows a length of the outer labels 100 after manufacturing as in FIG. 12 and cut to width. This allows the outer labels 100 to be rolled up as in FIG. 17 which shows roll 415 with a length of the outer label 100 beginning to be wrapped around the container 500. FIG. 18 shows a similar cut length of the inner labels 200 and could be rolled similar to the outer label roll 415 shown in FIG. 17.

Figure 19:
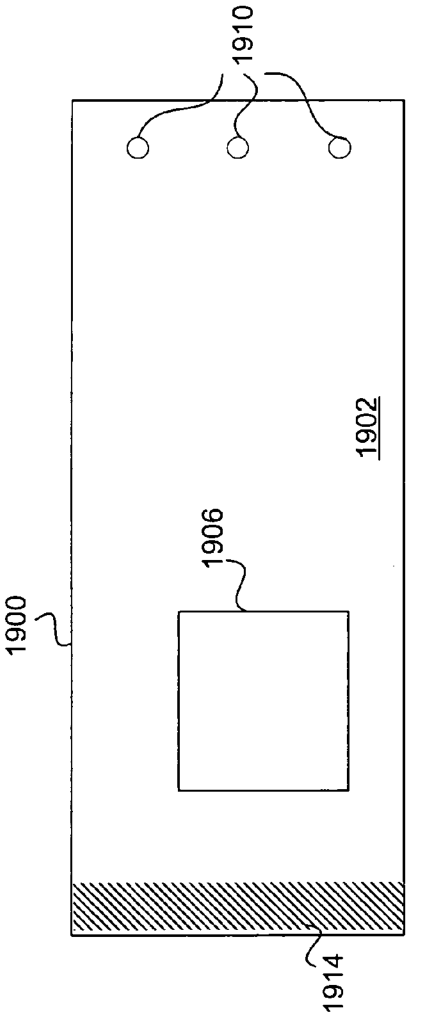
FIG. 19 is an alternative embodiment of an outer label.

FIGS. 19–23 illustrate a further embodiment of a rotatable label system and method according to the present invention. Specifically, FIGS. 19 and 20*a* illustrate an outer label 1900 having a back surface 1902, a front surface 1904, and a transparent window 1906. The outer label 1900, as well as an inner label 2000, according to one embodiment, may be made of paper or plastic film (for use in a wet environment) or any other material appropriate for container labels. As shown, written indicia 1908 is disposed on the outer label front surface 1904.

Figure 20A:
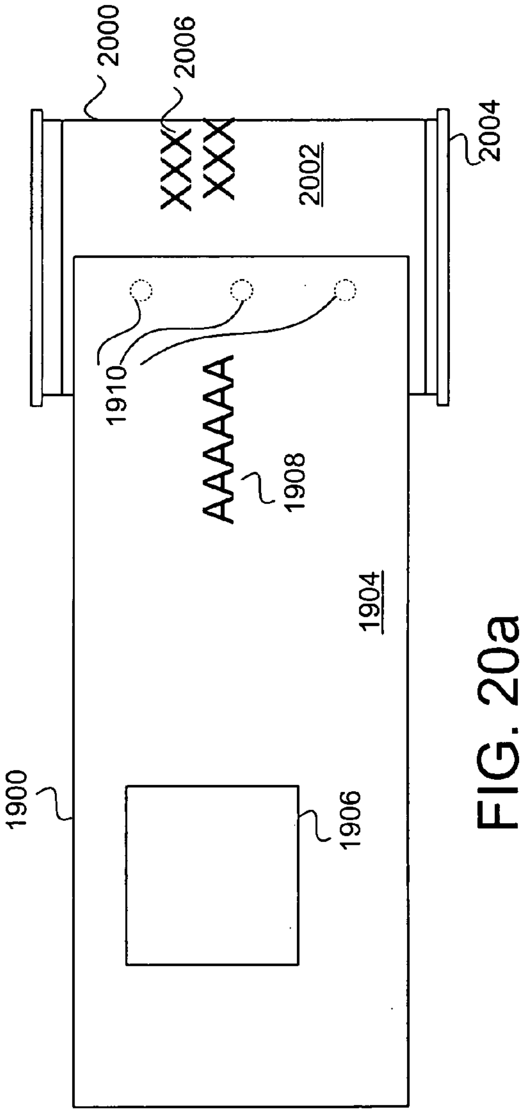
FIG. 20*a* is the outer label of FIG. 19 temporarily coupled an object.

In one embodiment, an adhesive 1910 (e.g., at least one glue droplet or dot as illustrated in FIG. 20*a*) is disposed on the outer label back surface 1902 adjacent to or near a label leading edge for temporarily adhering the outer label 1900 to the inner label 2000 as discussed below. In one embodiment, the adhesive 1910 is a temporary adhesive. Alternatively, the adhesive 1910 is disposed on an inner label front surface 2002 prior to application of the outer label 1900. In another embodiment, there is no inner label 2000 and instead the adhesive 1910 is disposed directly on an exterior surface of a container 2004.

An adhesive 1914 may also be disposed on the outer label back surface 1902 adjacent to an outer label trailing edge 1916. In one embodiment, the adhesive 1914 is permanent. Alternatively, the adhesive 1914 may comprise a temporary adhesive to allow the outer label 1900 to be easily removed from about the container 2004.

In exemplary embodiments, with the exception of the adhesive 1910 and the adhesive 1914, the label back surface 1902 is substantially non-adhesive. Also note that a slip agent may be applied to outer label back surface 1902 and/or inner label front surface 2002 in various embodiments to create a coefficient of friction (e.g., between 1.5 to 2.0) between the surfaces 1902 and 2002. The slip agent also prevents the adhesive 1910 from getting into pores of the inner label front surface 2002, thereby further lessening the strength of the bond between surfaces 1902 and 2002.

In these embodiments, and the embodiments discussed below, the inner label front surface 2002 may be coated with a varnish. The varnish impedes the adhesive 1910 from making a strong, permanent bond with inner label front surface 2002. Further, if the inner label 2000 is coated with a varnish or a slip agent, the adhesive 1910 can be replaced with a more permanent adhesive, which will not permanently adhere to the inner label front surface 2002 due to the presence of the varnish or slip agent disposed thereon.

Figure 20B:
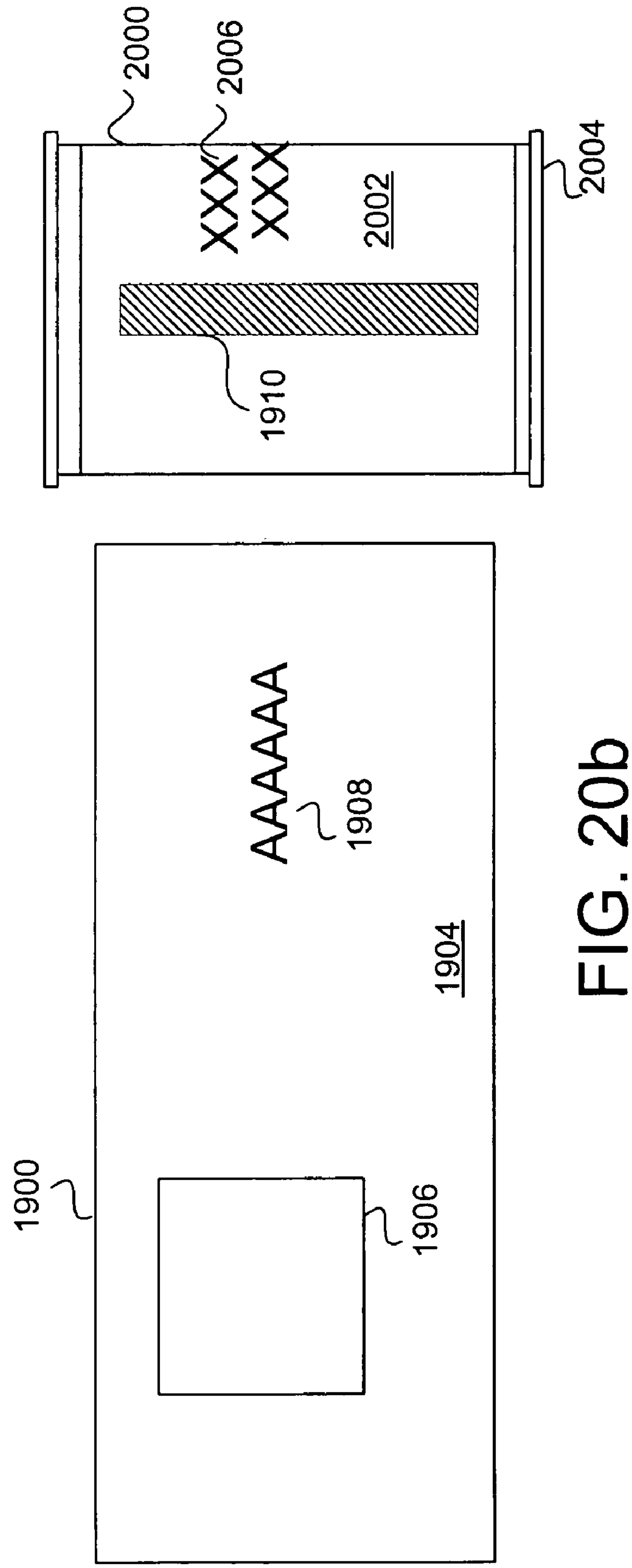
FIG. 20*b* illustrates an alternative temporary coupling mechanism for application of the outer label of FIG. 19.

As shown in FIG. 20*a*, the outer label 1900 is temporarily adhered to the front surface 2002 of the fixed inner label 2000 by the adhesive 1910 to temporarily secure the outer label 1900 about the container 2004. Specifically, by adhering the outer label 1900 to the inner label 2000 with only the adhesive 1910, the adhesive 1910 act to temporarily secure the outer label 1900 to the container 2004 (via inner label 2000) while the outer label 1900 is wrapped and secured about the container 2004. The adhesive 1910 is configured to permit the outer label 1900 to be detached from the inner label 2000, once the outer label 1900 is secured about the container 2004, such that the outer label 1900 may be rotated relative to the inner label 2002 and the container 2004 as discussed below. It should be understood that while FIG. 19 illustrates the adhesive 1910 as including three glue dots disposed on the outer label back surface 1902. Those skilled in the art will appreciate however, that the different numbers, sizes, shapes, and patterns of adhesive 1910 may also be effectively employed. For example, FIG. 20*b* illustrates an alternative adhesive pattern (i.e., a strip of temporary adhesive) for application to the container 2004 or the inner label 2000.

Preferably, the adhesive 1910 should be in a sufficient amount, size, and geometry to temporarily adhere the outer label 1900 to the inner label 2000 while the outer label 1900 is wrapped around the container 2004. The adhesive 1910 should also permit the adhered connection of the outer label 1900 and the inner label 2000 along the adhesive 1910 to be easily broken by rotating the outer label 1900 relative to the inner label 2000 as discussed below. To accomplish this result, an adhesive that has decreased adhesive strength over time, such as a time-release adhesive, may be employed. An example of an acceptable adhesive 1910 for this embodiment and the embodiments discussed below (also referred to herein as temporary adhesive) is hot pick-up cement sold under product number 284-332 by Ato Findlay Inc. of Milwaukee, Wis. An example of an acceptable permanent adhesive 1914 is hot melt adhesive sold under product number 335-335 by Ato Findlay Inc. of Milwaukee, Wis.

Hot pickup cement 284-332 is a resin with a soft point of 165° F. It typically comes in the form of pick-ets (pellets) and has a low viscosity of about 278 cP at 250° F./27/100 rpm. Its normal operating range is about 250° to 275° F. and has a staining point of 150° F. This temporary adhesive has an excellent pick-up bond that cools to a brittle bond, which is easily broken.

Hot melt adhesive 335-335 has a softening point of 162° F. and a thermal viscosity of 1,240 cP at 325° F./27/100 rpm. The density of hot melt adhesive 335-335 is 0.98 g/cc and has a suggested running temperature of 320° F. to 340° F. This permanent adhesive is versatile and adheres well to a variety of surfaces. It should be noted that the temporary and permanent adhesives described above are merely examples. Alternative embodiments may use other types or forms of adhesives (e.g., different brands, viscosity, softening points, densities, etc.).

Figure 21:
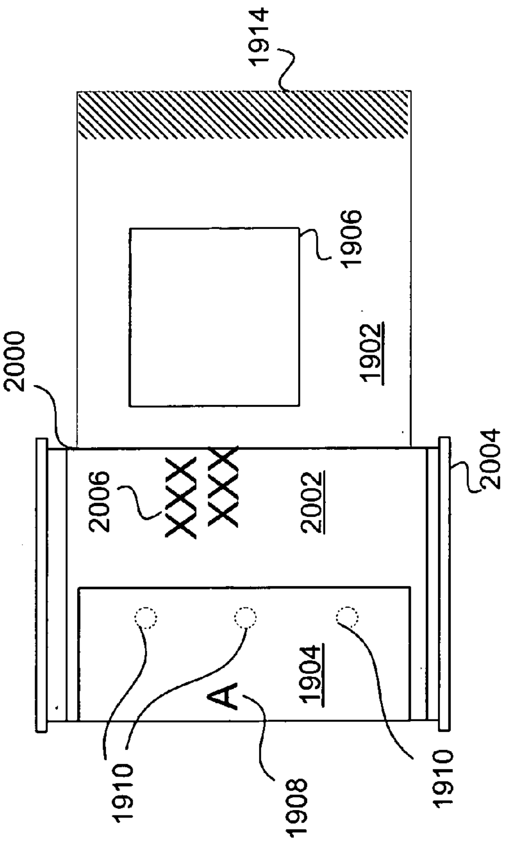
FIG. 21 is the outer label of FIG. 19 being wrapped around the object.

FIG. 21 illustrates the outer label 1900 partially wrapped about the container 2004. As shown, the adhesive 1910 (illustrated in phantom) maintains the outer label 1900 temporarily coupled to the inner label 2000 and, thus, temporarily secured to the container 2004. The outer label 1900 is then moved from the position illustrated in FIG. 21 to the position illustrated in FIG. 22 to secure the outer label 1900 about the container 2004. In particular, the outer label back surface 1902 is adhered to the outer label front surface 1904 by the adhesive 1914 disposed on the outer label back surface 1902 to secure the outer label 1900 about the container 2004.

Figure 22:
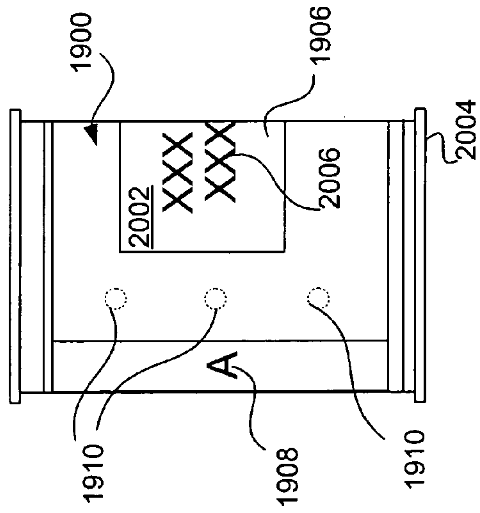
FIG. 22 is the outer label of FIG. 19 secured about the object.
Figure 23:
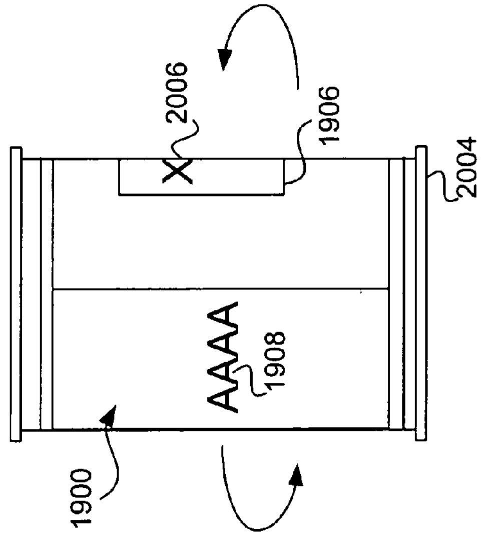
FIG. 23 is the outer label of FIG. 19 being rotated about the object.

With the outer label 1900 secured about the container 2004 as shown in FIG. 22, the outer label 1900 is then rotated relative to the inner label 2000 to detach the outer label 1900 from inner label 2000 to permit the outer label 1900 to rotate about the container 2004. Specifically, rotating the outer label 1900 from the position shown in FIG. 22 to the position shown in FIG. 23 subjects the adhesive 1910 to shear stresses. These shear stresses cause the coupling of the inner label 2000 to the outer label 1900 to fail along the adhesive 1910 to permit the outer label 1900 to rotate relative to the inner label 2000. By permitting the outer label 1900 to rotate relative to the inner label 2000, the written indicia 2006 disposed on the inner label front surface 2002 may be viewed through the transparent window 1906.

Figure 24:
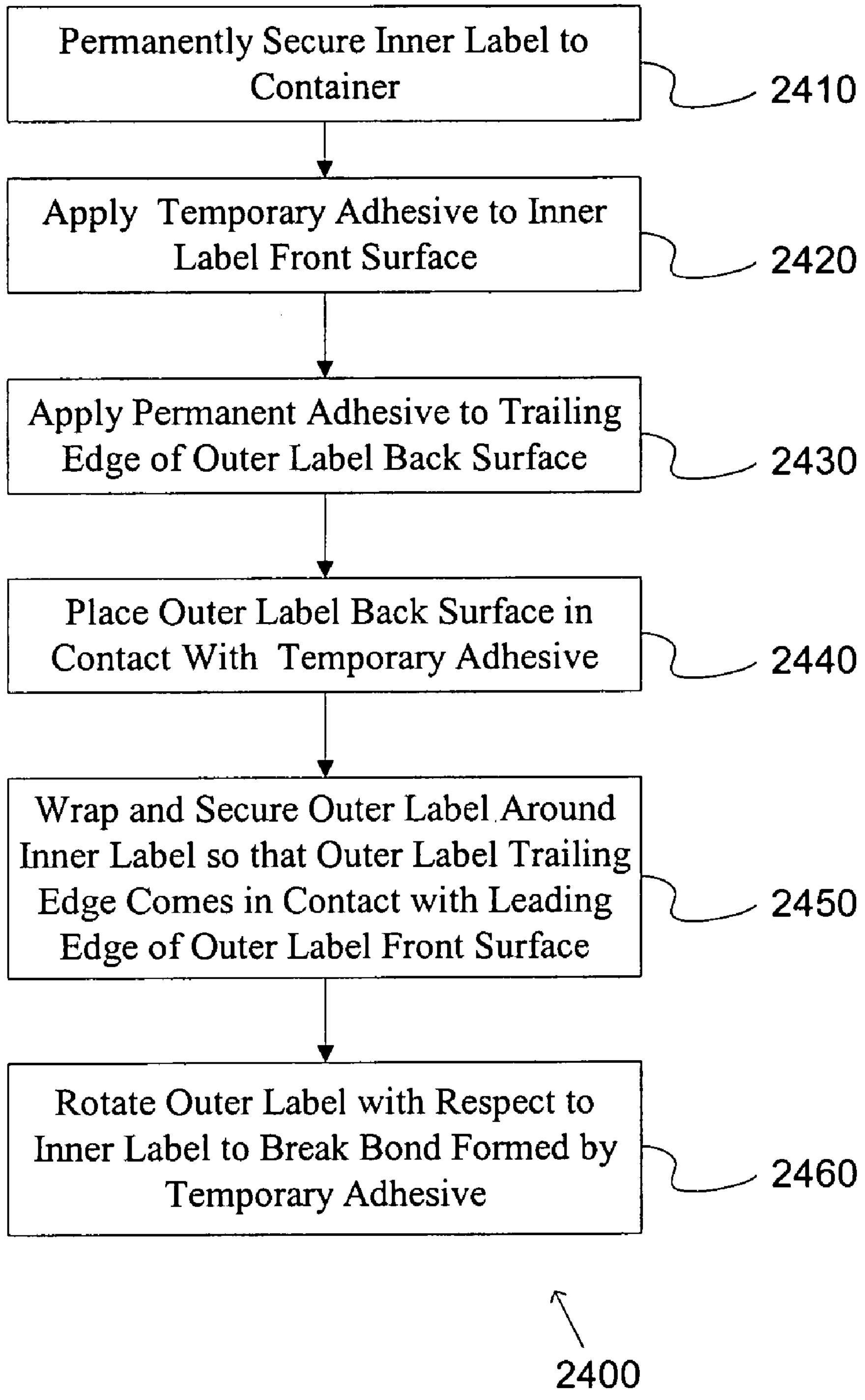
FIG. 24 is a flowchart of a method for applying the outer label of FIG. 19.

FIG. 24 is a flowchart 2400 illustrating steps for constructing a rotatable label system according to one embodiment of the present invention. The method 2400 may be employed with the labels described above in conjunction with FIGS. 19–23. At step 2410, cut and stack labeling machinery permanently secures an inner label to a container. Alternatively, step 2410 can be skipped and instead text is provided directly on the container. At step 2420, labeling machinery applies temporary adhesive to the inner label front surface. Alternatively, the temporary adhesive can be applied to the container's outer surface if there is no inner label. At step 2430, labeling machinery applies adhesive (e.g., permanent adhesive) to or near the trailing edge of the outer label back surface. At step 2440, labeling machinery places the outer label back surface in contact with the inner label, thereby temporarily coupling the outer label to the inner label via the temporary adhesive. It should be noted that steps 2430 and 2440 may be reversed in the flowchart (i.e., temporarily coupling the outer label before applying permanent adhesive to or near the trailing edge). At step 2450, the labeling machinery wraps and secures the outer label around the inner label so that the trailing edge of outer label back surface comes in contact with the outer label front surface. At optional step 2460, the label machinery rotates the outer label with respect to the inner label to break the bond formed by the temporary adhesive between the outer label and the inner label.

Those skilled in the art will appreciate that either the cut-and-stack labeling machinery, roll-fed labeling machinery, or both, may be employed to apply the inner and outer labels to the container. For example, a roll-fed machine may apply the inner label and a cut-and-stack machine may apply the outer label, or vice versa. Alternatively, cut-and-stack machinery or roll-fed machinery may be used to mount both an inner label and an outer label to a container.

Figures 25A, 25B, 25C:
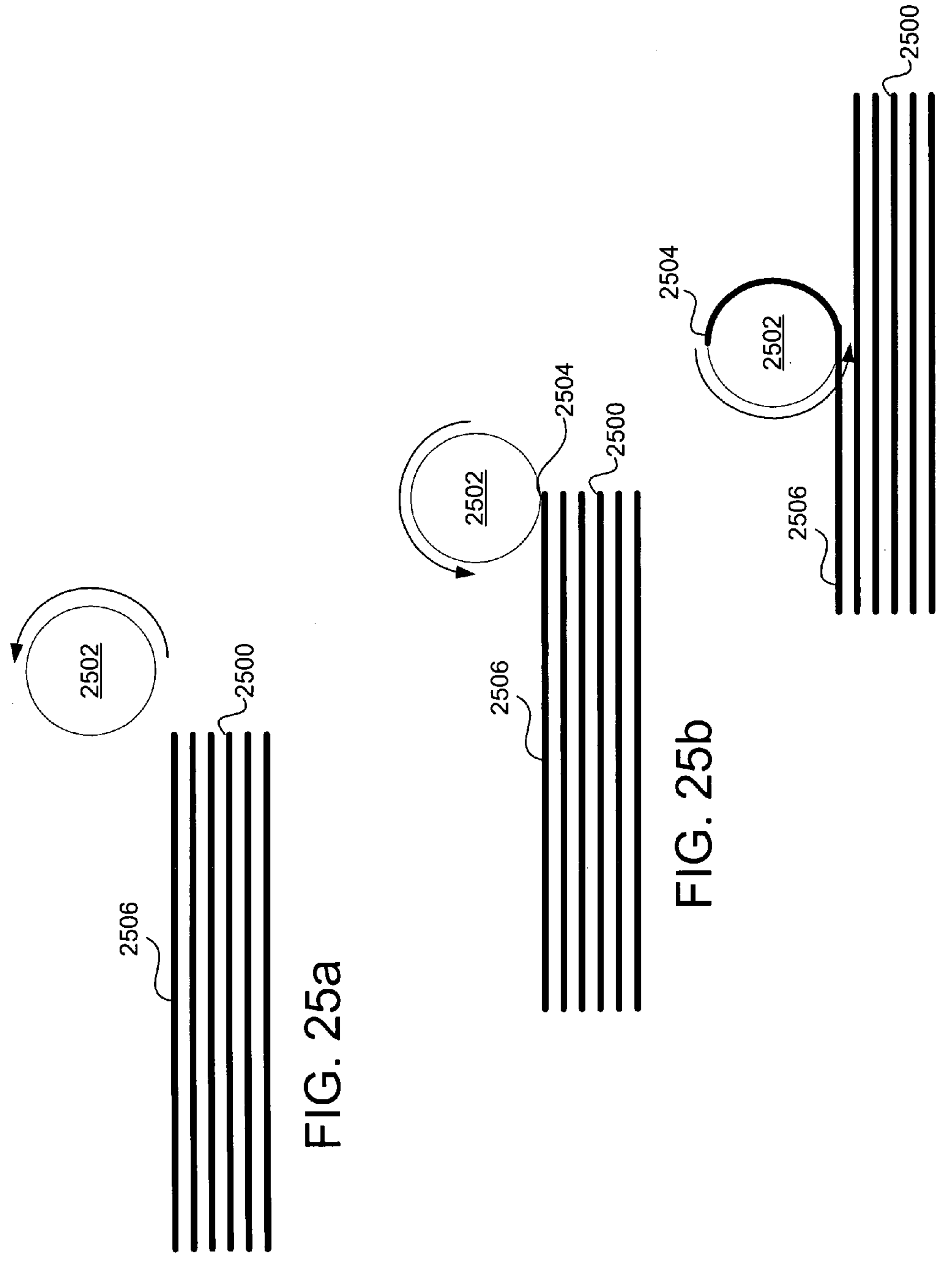
FIGS. 25*a*–25*c* illustrate the method of FIG. 24.

Referring now to FIGS. 25*a*–25*c*, the exemplary method of FIG. 24 is illustrated in more detail. In FIG. 25*a*, a stack of labels 2500 and an object 2502 are provided. In one embodiment, the stack of labels 2500 and the object 2502 are processed on the cut-and-stack labeling machinery. A temporary adhesive 2504 is then applied to a front surface of the object 2502 or an inner label on the object 2502. Alternatively, the temporary adhesive 2504 may be applied to a back surface of an outer label 2506 from the stack of labels 2500. Subsequently, the object 2502 will, via the temporary adhesive 2504, couple to the outer label 2506 as shown in FIG. 25*b*. As the object 2502 is rotated, the outer label 2506 will wrap around the object 2502 until an adhesive at or near the trailing end of the outer label 2506 contacts a front surface of the outer label 2506, thereby securing the outer label 2506 about the object 2502.

The invention has been described above with references to exemplary embodiments. It will be apparent to those skilled in the art that various modifications may be made and other embodiments can be used without departing from the broader scope of the invention. Therefore, these and other variations upon the specific embodiments are intended to be covered by the present invention, which is limited only by the appended claims.

What is claimed is:

1. A method of applying a rotatable label system to an object, comprising:

affixing an inner label with indicia disposed thereon about an object;

temporarily coupling an outer label having indicia disposed thereon to the inner label while the outer label is wrapped about the object; and securing the outer label about the object.

2. The method of claim 1 further comprising removing the temporary coupling to permit the outer label to rotate about the object.

3. The method of claim 2 wherein the removing the temporary coupling comprises rotating the outer label relative to the object.

4. The method of claim 1 wherein the temporarily coupling comprises providing a small amount of liquid between a front surface of the inner label and a rear surface of the outer label.

5. The method of claim 1 wherein the temporarily coupling comprises applying an external physical pressure to the outer label.

6. The method of claim 1 wherein the temporarily coupling comprises applying a vacuum pressure to the outer label.

7. The method of claim 1 wherein the temporarily coupling comprises applying at least one dot of an adhesive to a rear surface of the outer label.

8. The method of claim 1 wherein the securing comprises providing adhesive at a trailing end of the outer label so that the trailing end overlaps and adheres to a leading end of the outer label to rotatably couple the outer label around the object.

9. A method of applying a rotatable label to an object, comprising:

temporarily coupling an outer label having indicia disposed thereon to the object while the outer label is wrapped about the object; and securing the outer label about the object.

10. The method of claim 9 further comprising affixing an inner label with indicia disposed thereon about the object, the outer label being temporarily coupled to the inner label.

11. The method of claim 9 wherein the temporarily coupling comprises applying at least one dot of an adhesive to a rear surface of the outer label.

12. The method of claim 9 wherein the temporarily coupling comprises applying an external physical pressure to the outer label.

13. The method of claim 9 further comprising removing the temporary coupling to permit the outer label to rotate about the object.

14. The method of claim 9 wherein the temporarily coupling comprises providing a small amount of liquid between the object and the outer label.

15. The method of claim 9 wherein the temporarily coupling comprises applying an external gaseous pressure.

16. The method of claim 9 wherein the temporarily coupling comprises applying a vacuum pressure to the outer label.

17. A rotatable label system comprising:

an inner label affixed about an object;

an outer label; and a temporary coupling mechanism configured for temporarily coupling the outer label to the inner label.

18. The rotatable label of claim 17 wherein the temporary coupling mechanism comprises a small amount of liquid disposed between the inner label and the outer label.

19. The rotatable label of claim 17 wherein the temporary coupling mechanism comprises an external physical pressure disposed on the outer label.

20. The rotatable label of claim 17 wherein the temporary coupling mechanism comprises a vacuum pressure.

21. The rotatable label of claim 17 wherein the temporary coupling mechanism comprises an external gaseous pressure.

22. The rotatable label of claim 17 wherein the temporary coupling mechanism comprises at least one dot of adhesive applied to a rear surface of the outer label.

23. The rotatable label of claim 17 further comprising a transparent portion disposed on the outer label and configured for viewing underlying indicia.

24. A rotatable label system comprising:

an outer label;

a temporary coupling mechanism configured for temporarily coupling the outer label about an object; and adhesive configured to be disposed to a rear surface at or near a trailing end of the outer label for securing the outer label to itself.

25. The rotatable label system of claim 24 further comprising a transparent portion disposed on the outer label and configured for viewing underlying indicia.

26. The rotatable label of claim 24 wherein the temporary coupling mechanism comprises an external physical pressure.

27. The rotatable label of claim 24 wherein the temporary coupling mechanism comprises at least one dot of adhesive applied to a rear surface of the outer label.

28. The rotatable label of claim 24 further comprising an inner label configured to be affixed to the object, the outer label configured for coupling to the inner label.

29. The rotatable label of claim 24 wherein the temporary coupling mechanism comprises a small amount of liquid disposed between the object and the outer label.

30. The rotatable label of claim 24 wherein the temporary coupling mechanism comprises a vacuum pressure.

31. The rotatable label of claim 24 wherein the temporary coupling mechanism comprises an external gaseous pressure.

* * * * *